(12) United States Patent
Spindel et al.

(10) Patent No.: US 7,924,161 B1
(45) Date of Patent: Apr. 12, 2011

(54) METHODS AND SYSTEMS FOR IDENTIFYING OBJECTS AS SETS AND LOCATING AND TRACKING IDENTIFIED SETS

(76) Inventors: Martin Spindel, New York, NY (US); Nadine Cino, New York, NY (US)

( * ) Notice: Subject to any disclaimer, the term of this patent is extended or adjusted under 35 U.S.C. 154(b) by 0 days.

(21) Appl. No.: 12/965,740

(22) Filed: Dec. 10, 2010

Related U.S. Application Data

(60) Provisional application No. 61/283,920, filed on Dec. 10, 2009.

(51) Int. Cl.
| | |
|---|---|
| G08B 13/14 | (2006.01) |
| G08B 23/00 | (2006.01) |
| H04Q 5/22 | (2006.01) |
| G06F 7/00 | (2006.01) |
| G06F 19/00 | (2011.01) |
| G06Q 90/00 | (2006.01) |
| G06Q 30/00 | (2006.01) |

(52) U.S. Cl. ............... 340/572.4; 340/572.1; 340/573.1; 340/573.3; 340/10.32; 340/10.4; 235/385; 700/219; 700/229

(58) Field of Classification Search ............... 340/572.4, 340/572.1, 573.1, 573.3, 10.32, 10.4; 235/385; 700/219, 229
See application file for complete search history.

(56) References Cited

U.S. PATENT DOCUMENTS

| | | | |
|---|---|---|---|
| 7,075,412 B1 * | 7/2006 | Reynolds et al. | 340/10.2 |
| 7,076,441 B2 | 7/2006 | Hind et al. | |
| 7,333,016 B2 * | 2/2008 | Ancel | 340/572.1 |
| 2007/0283004 A1 * | 12/2007 | Buehler | 709/224 |
| 2008/0061976 A1 * | 3/2008 | Shafer | 340/572.1 |
| 2008/0297352 A1 * | 12/2008 | Charlot et al. | 340/572.1 |
| 2010/0039280 A1 * | 2/2010 | Holm et al. | 340/669 |
| 2010/0138755 A1 * | 6/2010 | Kulkarni et al. | 715/757 |

* cited by examiner

*Primary Examiner* — Benjamin C. Lee
*Assistant Examiner* — Andrew Bee
(74) *Attorney, Agent, or Firm* — American Patent Agency; Daniar Hussain

(57) ABSTRACT

One embodiment of the present invention is a method for determining when a set of RFID tags on a set of objects belongs to a same defined subset of objects ("set identification"). This method includes the steps of: (1) detecting the set of RFID tags on the set of objects, said RFID tags comprising integrated devices capable of sending signals that can be received by a receptor device and interpreted to determine a motion state of each RFID tag and object; (2) receiving said signals from the set of RFID tags; (3) interpreting said signals to determine the motion state of each RFID tag and object within the set, wherein said signals indicate whether the motion state of each RFID tag and object is in a state of stationary, starting in motion, stopping in motion, or continuing in motion; (4) determining which RFID tags and objects are in a same motion state within a predetermined time of each other; and (5) identifying the RFID tags that are in the same motion state, within the predetermined time, as belonging to the same defined subset of objects.

20 Claims, 18 Drawing Sheets

|  | Packed Stack 806 | | | | Packed Stack 808 | | |
|  | Zone 1 | | | | Zone 2 | | |
| Closest Cart> | Cart 1 | Cart 2 | Cart 3 |  | Cart 1 | Cart 2 | Cart 3 |
| 810 | | | | 810 | | | |
| Channel A | -50.0 | -69.0 | -64.0 | Channel A | -61.0 | -49.0 | -62.0 |
| Channel B | -65.0 | -71.0 | -62.0 | Channel B | -67.0 | -59.0 | -72.0 |
| Tag Average | -57.5 | -70.0 | -63.0 | Tag Average | -64.0 | -54.0 | -67.0 |
| 812 | | | | 812 | | | |
| Channel A | -48.0 | -72.0 | -64.0 | Channel A | -60.0 | -48.0 | -62.0 |
| Channel B | -64.0 | -74.0 | -63.0 | Channel B | -68.0 | -60.0 | -65.0 |
| Tag Average | -56.0 | -73.0 | -63.5 | Tag Average | -64.0 | -54.0 | -63.5 |
| 814 | | | | 814 | | | |
| Channel A | -48.0 | -76.0 | -88.0 | Channel A | -64.0 | -50.0 | -60.0 |
| Channel B | -60.0 | -74.0 | -67.0 | Channel B | -64.0 | -56.0 | -62.0 |
| Tag Average | -54.0 | -75.0 | -77.5 | Tag Average | -64.0 | -53.0 | -61.0 |
| 816 | | | | 816 | | | |
| Channel A | -51.0 | -80.0 | -66.0 | Channel A | -61.0 | -49.0 | -60.0 |
| Channel B | -65.0 | -80.0 | -67.0 | Channel B | -75.0 | -58.0 | -69.0 |
| Tag Average | -58.0 | -80.0 | -66.5 | Tag Average | -68.0 | -53.5 | -64.5 |
| 818 | | | | 818 | | | |
| Channel A | -53.0 | -90.0 | -66.0 | Channel A | -64.0 | -52.0 | -64.0 |
| Channel B | -65.0 | -88.0 | -65.0 | Channel B | -79.0 | -63.0 | -74.0 |
| Tag Average | -59.0 | -89.0 | -65.5 | Tag Average | -71.5 | -57.5 | -69.0 |
| 820 | | | | 820 | | | |
| Channel A | -48.0 | -69.0 | -68.0 | Channel A | -68.0 | -59.0 | -78.0 |
| Channel B | -60.0 | -80.0 | -72.0 | Channel B | -78.0 | -79.0 | -78.0 |
| Tag Average | -54.0 | -74.5 | -70.0 | Tag Average | -73.0 | -69.0 | -78.0 |
| Per Stack Averages | -56.4 | -76.9 | -67.7 |  | -95.0 | -79.5 | -94.3 |

Figure 5

METHODS AND SYSTEMS FOR IDENTIFYING OBJECTS AS SETS AND LOCATING AND TRACKING IDENTIFIED SETS

REFERENCE TO RELATED APPLICATIONS

The present application is a non-provisional of provisional application U.S. Ser. No. 61/283,920, entitled "Mobile electronic cart and related methodologies and software for detecting, locating and tracking tagged items, and identifying sets of such items," filed on Dec. 10, 2009, the entirety of which is hereby incorporated by reference herein.

FIELD OF THE INVENTION

The current invention is within the field of electronic tracking. More specifically, the current invention is within the field of RFID and infrared tracking.

BACKGROUND OF THE INVENTION

Despite the economic recession, which required downward adjustments to RFID market forecasts for 2009 and 2010, the RFID market is expected to experience steady growth through the next five years. The overall RFID market is expected to exceed $8.25 billion by 2014. That would represent a 14% compound annual growth rate over the next five years. In 2010 alone, the RFID market appears set to reach a size of $4.47 billion, 15% more than the adjusted 2009 figure. Going to 2014, the greatest growth will be found in RTLS (Real Time Location Systems), baggage handling, animal ID, and item-level tagging in fashion apparel and retail. (Source: ABI Research, Semi-Annual RFID Market Data, March 2010).

"Modernizing" applications for RFID will grow more rapidly than their "traditional" predecessors such as access control, automobile immobilization, electronic toll collection, and others that account for slightly more than 61% of the total market today. These "traditional" applications are expected to grow 6% compounded annually from 2010 through 2014. In contrast, "modernizing" applications—animal ID, asset management, baggage handling, cargo tracking and security, POS-contactless payment, RTLS, supply chain management, and ticketing—are forecast to grow roughly 19% in the same time period. (Source: ABI Research, Semi-Annual RFID Market Data, March 2010).

There has been much research and development into RFID tagging and tracking technologies. However, all such research has examined tagging and tracking single tags in isolation. The large projected growth in "modernizing" applications brings a new need in the market for an ability to identify, locate, and track sets of tags in real-time.

Therefore, it was recognized by the present inventors that a breakthrough in the state of the art would allow RFID systems to identify sets of tags in real-time, and to use the identified sets to locate and track the movement of the objects to which the RFID tags are attached. It is against this background that various embodiments of the present invention were developed.

SUMMARY OF THE INVENTION

Accordingly, one embodiment of the present invention is a method for determining when a set of RFID tags on a set of objects belongs to a same defined subset of objects ("set identification"). This method includes the steps of: (1) detecting the set of RFID tags on the set of objects, said RFID tags comprising integrated devices capable of sending signals that can be received by a receptor device and interpreted to determine a motion state of each RFID tag and object; (2) receiving said signals from the set of RFID tags; (3) interpreting said signals to determine the motion state of each RFID tag and object within the set, wherein said signals indicate whether the motion state of each RFID tag and object is in a state of stationary, starting in motion, stopping in motion, or continuing in motion; (4) determining which RFID tags and objects are in a same motion state within a predetermined time of each other; and (5) identifying the RFID tags that are in the same motion state, within the predetermined time, as belonging to the same defined subset of objects.

Another embodiment of the present invention is the method described above, wherein each RFID tag has an integrated motion sensor.

Another embodiment of the present invention is the method described above, wherein each RFID tag has an integrated accelerometer.

Another embodiment of the present invention is the method described above, wherein said receptor device comprises a Doppler detector.

Another embodiment of the present invention is the method described above, wherein the motion state of each RFID tag is determined using the Doppler Effect.

Another embodiment of the present invention is the method described above, wherein the motion state of each RFID tag is determined based upon properties of waves transmitted by said RFID tag. Such wave properties can include polarity, phase, length, amplitude, other properties, and combinations of such properties.

Another embodiment of the present invention is the method described above, wherein the objects are any of containers, boxes, dollies, pallets, or carts.

Another embodiment of the present invention is the method described above, wherein the objects are any of railroad cars, trucks, cars, boats, or livestock.

Another embodiment of the present invention is the method described above, wherein a quantity of objects is identified as being in the same subset and said quantity is used to attribute properties to the subset of objects. For example, a large number of boxes (e.g., 30), can only be nested inside each other with the lids open, and cannot be stacked on top of each other with the lids closed.

Another embodiment of the present invention is the method described above, wherein a determination is made as to an average received signal strength of the RFID tags that belong to the defined subset of objects. Since the set of RFID tags have been identified as belonging to the same defined subset, the received signal strength may be averaged over the set of RFID tags.

Another embodiment of the present invention is the method described above, wherein a determination is made as to a zone in which the defined subset of objects is located, said determination based upon an average received signal strength of the RFID tags that belong to the defined subset of objects.

Another embodiment of the present invention is the method described above, that also includes the step of receiving an infrared signal by at least one RFID tag in the defined subset of objects to determine a location of all objects in the defined subset of objects. Since the RFID tags have been identified as belonging to the same defined subset, receiving an infrared signal by a single RFID tag in the identified subset can be used to infer the location of the entire subset.

Another embodiment of the present invention is the method described above, that also includes the step of receiving an infrared signal by at least one RFID tag in the defined subset of objects to determine that all objects in the defined subset of objects have passed through a chokepoint. Since the RFID tags have been identified as belonging to the same defined subset, receiving an infrared signal from a chokepoint by a single RFID tag in the identified subset can be used to infer that the entire subset has passed the chokepoint.

Yet another embodiment of the present invention is a system for determining when a set of RFID tags on a set of objects belongs to a same defined subset of objects. The system includes a processor for processing program code, and one or more memories for storing program code, coupled to the processor, which when executed by the processor execute a process for identifying a set. The process includes the steps of: (1) detecting the set of RFID tags on the set of objects, said RFID tags comprising integrated devices capable of sending signals that can be received by a receptor device and interpreted to determine a motion state of each RFID tag and object; (2) receiving said signals from the set of RFID tags; (3) interpreting said signals to determine the motion state of each RFID tag and object within the set, wherein said signals indicate whether the motion state of each RFID tag and object is in a state of stationary, starting in motion, stopping in motion, or continuing in motion; (4) determining which RFID tags and objects are in a same motion state within a predetermined time of each other; and (5) identifying the RFID tags that are in the same motion state, within the predetermined time, as belonging to the same defined subset of objects.

Another embodiment of the present invention is the system described above, wherein each RFID tag has an integrated motion sensor.

Another embodiment of the present invention is the system described above, wherein said receptor device comprises a Doppler detector.

Yet another embodiment of the present invention is a system for determining when a set of RFID tags on a set of objects belongs to a same defined subset of objects. The system includes a set of RFID tags attached to said objects, said RFID tags comprising integrated devices capable of sending signals that can be received by a receptor device and interpreted to determine a motion state of each RFID tag and object within the set; a receiver for receiving signals from said RFID tags; a processor for processing program code; and one or more memories for storing program code, coupled to the processor, which when executed by the processor execute a process for identifying a set. The process includes the steps of: (1) detecting the set of RFID tags on the set of objects; (2) receiving said signals from the set of RFID tags; (3) interpreting said signals to determine the motion state of each RFID tag and object within the set, wherein said signals indicate whether the motion state of each RFID tag and object is in a state of stationary, starting in motion, stopping in motion, or continuing in motion; (4) determining which RFID tags and objects are in a same motion state within a predetermined time of each other; and (5) identifying the RFID tags that are in the same motion state, within the predetermined time, as belonging to the same defined subset of objects.

Another embodiment of the present invention is the system described above, wherein each RFID tag has an integrated motion sensor.

Another embodiment of the present invention is the system described above, wherein said receptor device comprises a Doppler detector.

Another embodiment of the present invention is the system described above, also including a Doppler detector for receiving said signals from the set of RFID tags.

Yet another embodiment of the present invention is an electronically outfitted Mobile Cart ("the Mobile Cart") and related methodologies that can be utilized to: (i) determine if items traveling along a path have moved past an antenna located on or near the path, (ii) determine the particular zone in which items are located within an area comprising several zones, (iii) determine the precise location (e.g., within a few feet of actual location) of an item, and (iii) spontaneously identify sets of items as such sets are formed in real time. The current invention discloses certain means of utilizing RFID, motion sensors, and infrared technology to determine the location of items.

BRIEF DESCRIPTION OF THE DRAWINGS

FIG. 5 shows a sample of zonal determination using RFID tags in accordance with another embodiment of the present invention;

DETAILED DESCRIPTION OF THE INVENTION

Figure 1A:
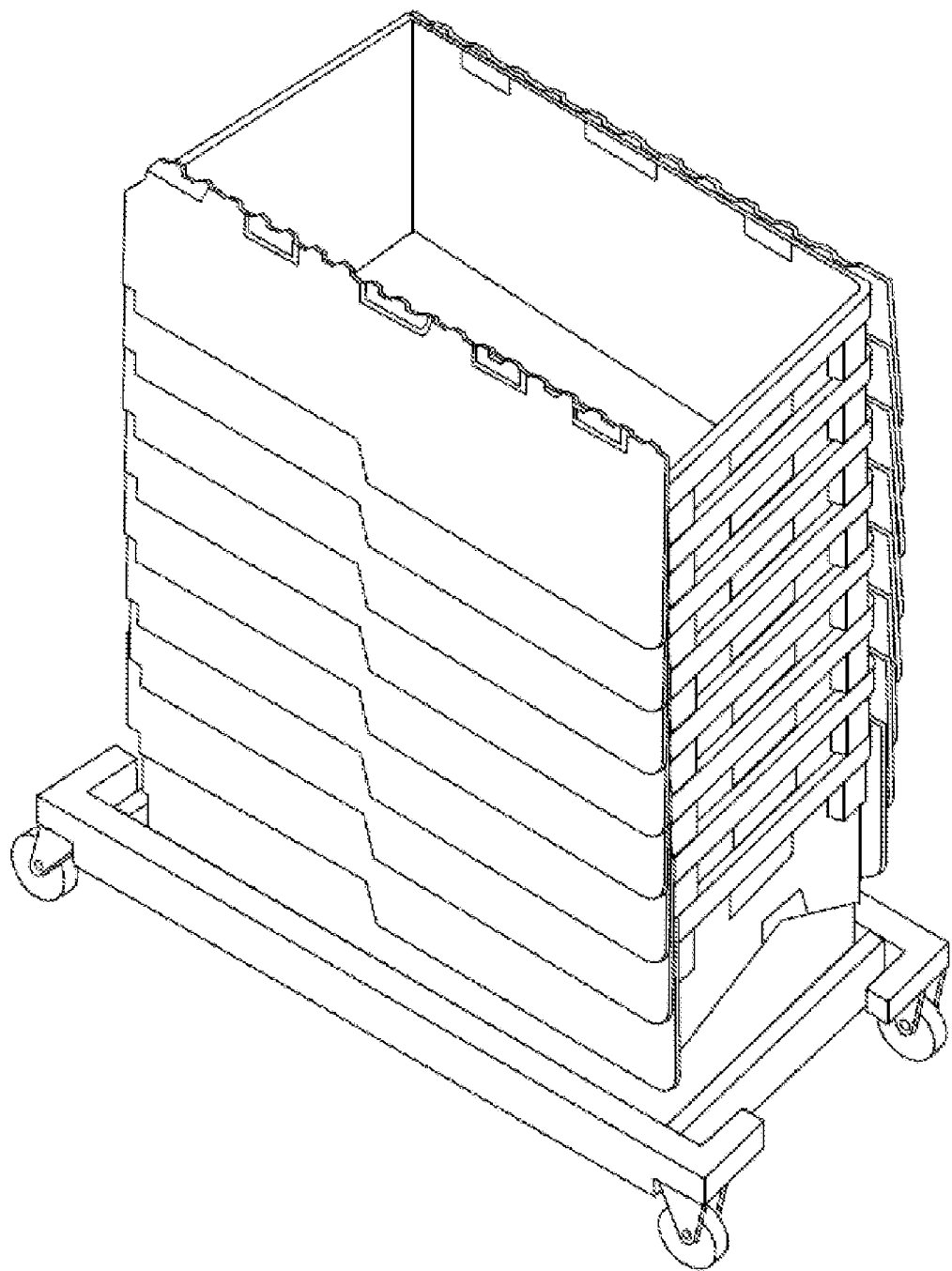
FIG. 1A shows a stack (set) of open containers stacked inside each other on a dolly, each container and the dolly having an electronic tag (hidden from view), according to one embodiment of the present invention.

According to the principles of the present invention, the form of electronic tracking technology utilized by the current invention is Radio Frequency Identification ("RFID"). RFID technology generally comprises two main elements: (i) an RFID tag (sometimes referred to simply as a "tag") and (i) an RFID reader (sometimes referred to simply as a "reader"). An RFID tag generally comprises a small chip (generally a "microchip") and an antenna, and is capable of wirelessly transmitting data such as a unique identification number stored on its chip. The present invention may be used with both "active" RFID tags as well as with "passive" or "semi-passive" RFID tags, all of which may have integrated motion sensors. Alternatively, the motion state of any of such active, passive or semi-passive RFID tag may be determined by the use of a Doppler detector, or other detector capable of utilizing properties of the waves emitted by the RFID tags to determine the motion state of the RFID tags. The RFID reader generally comprises one or more antennas, and is capable of receiving data wirelessly transmitted by the tag and communicating such data to another device such as a computer, via either wired or wireless communication means. Furthermore, the current invention discloses certain means (that represent an advance over the current state of the art) of using infrared signals in making or supplementing location determinations.

Active Tao

The RFID tag utilized in one embodiment of the current invention is an "active tag," which means that it has its own onboard battery that provides it with electrical power, thereby enabling the tag to transmit data and perform other functions. Furthermore, such tag comprises an onboard "motion sensor," which can sense whether the tag is in motion or stationary. The tag is adapted to wirelessly transmit such information, about its own "Motion State," to a reader which, in turn, is adapted to communicate such information to another device such as a computer via either wired or wireless communication means.

The RFID tag utilized in one embodiment of the current invention is adapted to receive and process an infrared signal ("beacon" or "beam") that may be wirelessly transmitted by an item of electronic equipment known as a "locator device". Such signal typically has a range of about 30 to 100 feet (shorter and longer ranges are possible), and carries a unique encoded number which effectively identifies the particular locator device from which it was sent. Any such locator device is typically positioned in a known or defined location. Such infrared signal is sometimes referred to as "exciting" or "stimulating" the tag and such locator device is sometimes referred to as an "exciter" or "stimulator".

The tag is adapted to wirelessly transmit the unique identification number of the locator device (along with the tag's own unique identification number) to a reader which, in turn, is adapted to communicate such identification numbers to another device such as a computer via either wired or wireless means. Since the defined location of the locator device is typically stored in a database, which can be used to determine that, at the moment that the unique identification number of the locator device was transmitted by the relevant tag, such tag was located within 30 to 100 feet of the applicable locator device (which has a known location).

Passive Tags

The present invention may also be practiced with "passive" as well as "semi-passive" tags in addition to "active" tags. Passive tags do not have an integrated battery, but are still capable of sending signals that can be received by a receptor device and interpreted to determine the motion state of the RFID tag, and by implication, the object to which the tag is attached. In one embodiment of the present invention, the motion state of each RFID tag is determined using the Doppler Effect, which is described in greater detail below. As an alternative to using the Doppler Effect, the motion state of each RFID tag may be determined based upon properties of waves transmitted by the RFID tag, where the wave properties can include polarity, phase, length, amplitude, other properties, and combinations of such properties.

Although passive tags have been historically associated with transmission ranges of about 10 feet or less, recent advances in passive tag technology have extended the range considerably, resulting in a category known as "long range passive tags". For example, the Omni-ID Ultra® tag is claimed by its manufacturer to have a range of 100 feet. Semi-passive tags have made similar strides in transmission ranges. For example, the tag manufacturer Intellexflex claims that semi-passive tags with its XC3 Technology® have a range of over 300 feet. Passive and semi-passive tags may be adapted to include integrated devices such as integrated motion sensors or accelerometers, or may be adapted to receive and process infrared signals that may be wirelessly transmitted by a locator device.

Chokepoint

Tags are commonly used where there is a need to detect the presence of tagged items within a defined area, for example, within a warehouse or within a section (or zone) thereof. Although such technology has been generally successful in detecting presence, it has been significantly less successful in determining if items traveling along a path have moved past an antenna (or across a particular line) located on the path, or, in the terminology of the present invention, have "passed through a chokepoint." Such antenna would be attached to and in communication with a reader. Typically, such antenna would be located within a relatively short range of the items passing by it (e.g., 5 to 10 feet). Certain RFID technologies (known as "real time location systems") can detect when a tagged item has moved across a defined line (without the need for the item to pass a physical antenna). Such technologies frequently utilize radio waves in the Ultra-Wideband or Wi-Fi ranges.

For example, if tagged items are being delivered to the interior of an office building, an antenna (and attached reader) may be positioned inside such building at a location which the tagged items would normally pass through in the course of the delivery. When tagged items actually pass by the antenna, they are deemed to have "passed through the chokepoint". Current RFID systems utilizing active tags, could easily detect the presence of tagged items near such an antenna, but have difficulty in determining if such items have actually moved past the antenna.

Set Identification

In detecting presence, current RFID systems typically identify individual tagged items. However, they do not spontaneously identify sets of tagged items as such sets are formed in real time. The current invention provides a method that, under certain circumstances, can identify sets of tagged items as such sets are formed in real time (without isolating the tagged items comprising such sets from other tagged items).

One benefit of such functionality is that it provides enhanced information in units of sets, rather than mere individual units. For example, such functionality could identify 7 stacks of 10 units each, rather than merely identifying 70 units. In another example, if sets of 10 units have different properties than sets of 5 units (other than the quantity of units per set), then set identification allows a mechanism to recognize such properties. Another benefit is the ability to identify sets in real time, which can be used to improve the success rate (accuracy and reliability) of the methods and processes discussed herein.

An advance offered by the current invention is that tagged items can be identified as sets without a requirement that the items travel through a chokepoint (i.e., moving passed an antenna, typically within 5 to 10 feet of the antenna). Prior to the present invention, identifying tagged items as a set has required moving all such items through a chokepoint at the same time, during a period of time when no other items are passing through the chokepoint. The present invention eliminates the need to pass items through a chokepoint in order to identify such items as a set. The present invention provides means of identifying items as a set, even when such items are located hundreds of feet (or more) away from the nearest antenna and are not passing by the antenna in any manner. When an RFID reader reads tags within a broad area (such as 10,000 square feet or more) such reading activity is often referred to as "polling" or "monitoring" the tags. Such polling or monitoring activity is distinguished from reading tags as they move through a narrow area, referred to as a "chokepoint". Polling or monitoring of tags can occur whether the tags are stationary or in motion.

Mobile Cart

Currently, many RFID systems involve relatively permanent, hard wired electronic equipment that are difficult, time consuming and expensive to install, and can only be utilized in the particular location in which they have been installed. Some current "chokepoint systems" utilize cumbersome "tunnels" comprised of materials that isolate the radio waves transmitted by tagged items located inside such tunnels. As an alternative to such permanent structures, the Mobile Cart disclosed by the current invention requires virtually no installation, no hard wiring, no tunnels, and can easily be moved from location to location.

Container and Dolly

Two particular items initially utilized herein to exemplify the functionality of the current invention are a particular: (i) "nestable plastic container" and (ii) a compatible dolly. Such container is rigid in structure, made primarily of plastic, has four vertical sloped sidewalls and has a set of attached lids at its top.

As shown in FIG. 1A, when such lids are in open position and the container is empty, like units of such container can be nested one inside another in the manner commonly seen in stacks of empty paper cups (one cup nested inside another). As further shown in FIG. 1A, the lowermost unit of the container is resting atop a compatible dolly.

Figure 1B:
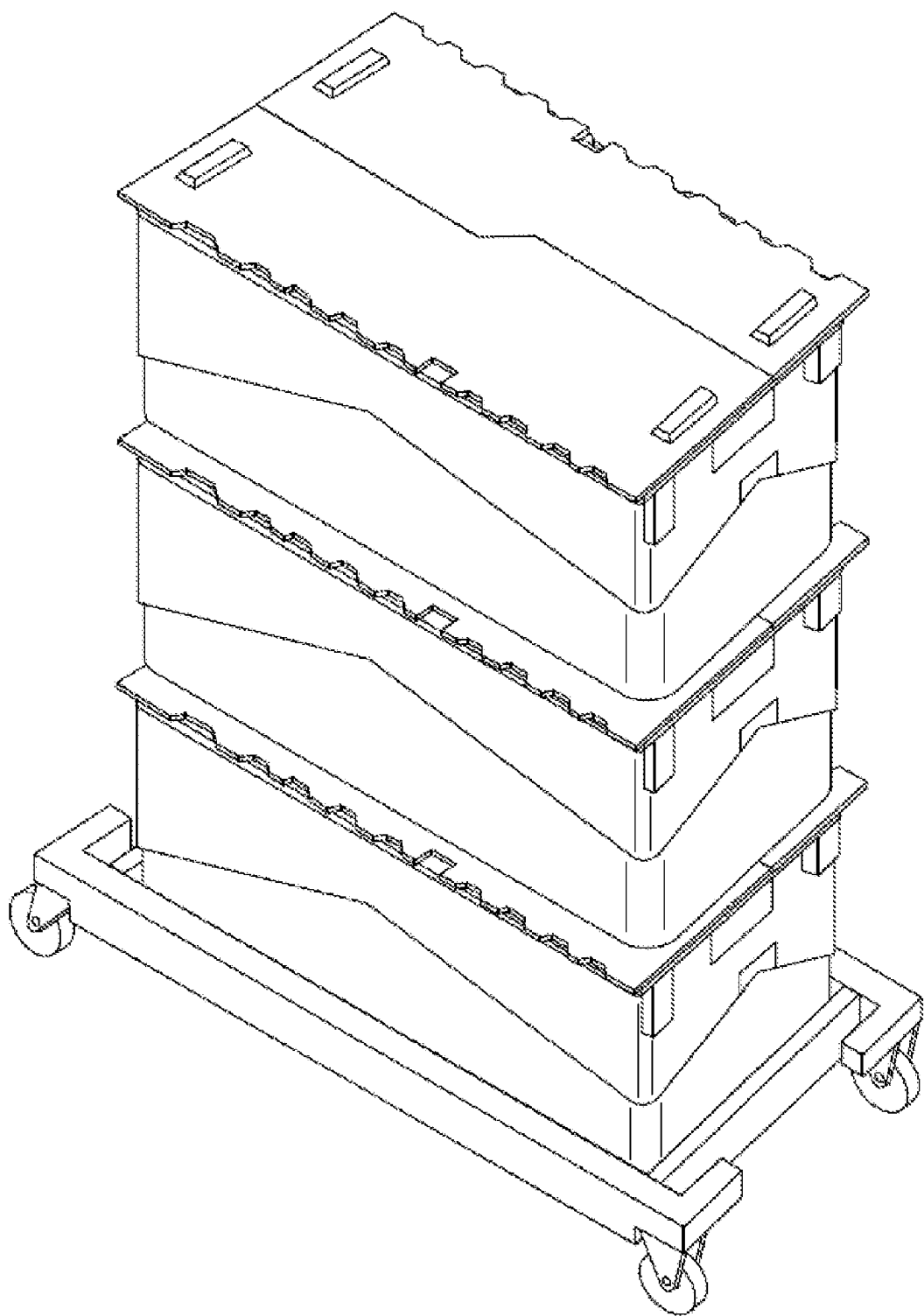
FIG. 1B shows a stack (set) of closed containers stacked on top of each other on a dolly, each container and the dolly having an electronic tag (hidden from view), according to one embodiment of the present invention.

As shown in FIG. 1B, when such lids are in closed position (which would typically be the case when the container is filled with content), like units of such container can be stacked one atop another—with the bottom of each upper unit resting on the lid of the unit immediately beneath it, and the lowermost unit resting atop the compatible dolly.

Figure 1C:
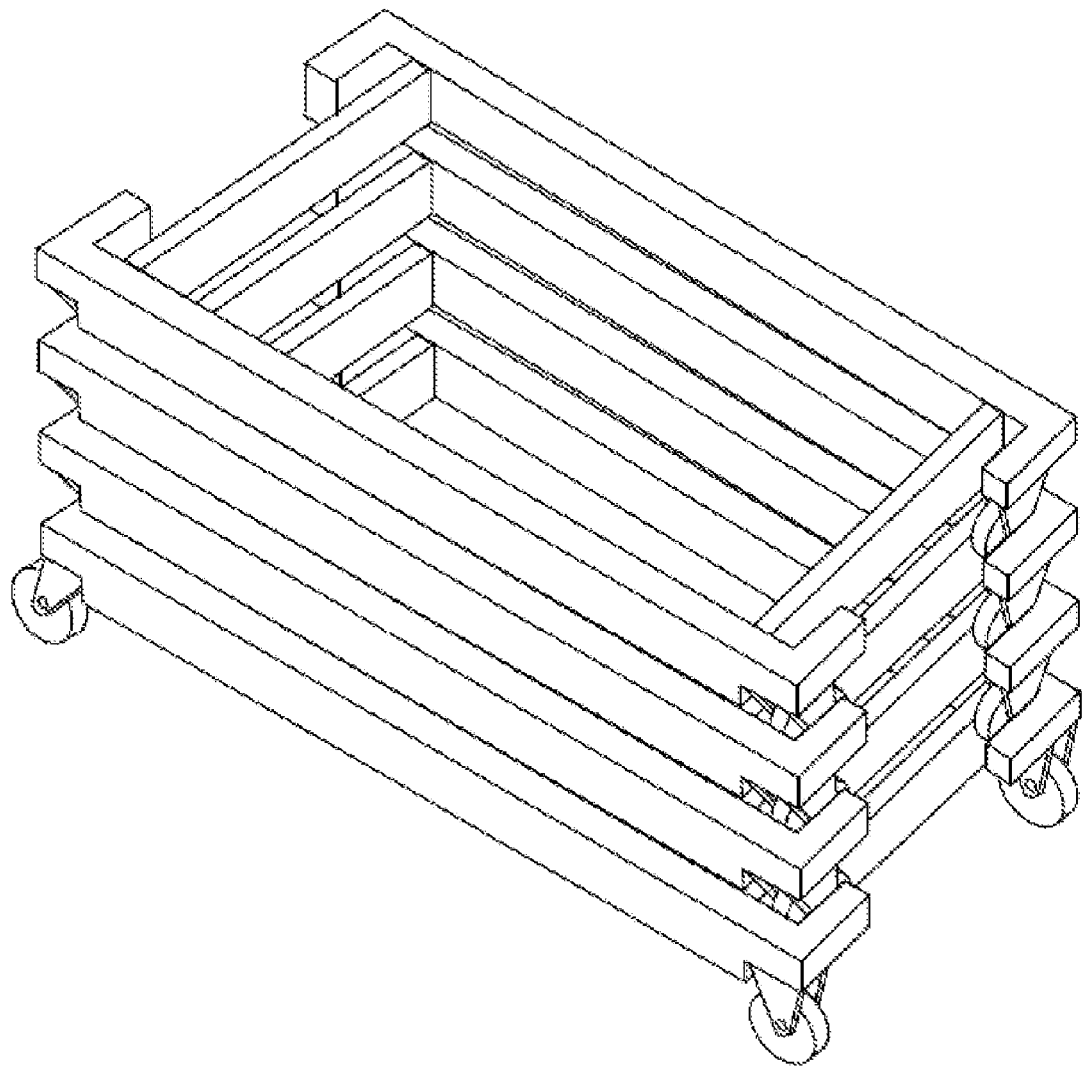
FIG. 1C shows a stack (set) of dollies stacked on top of each other, each dolly having an electronic tag (hidden from view), according to one embodiment of the present invention.

FIG. 1C shows a stack of dollies, or low lying wheeled carts, that are designed to hold a stack of the aforementioned containers, and be manually pushed while such containers are atop it. When such dollies are empty, like units can be stacked one atop another in the manner shown in FIG. 1C. The applicants hereunder jointly hold U.S. Pat. No. 6,105,980, which pertains to one version of such nestable plastic container and compatible dolly. Other versions of nestable plastic container and compatible dolly are available and are within the scope of the present invention.

In a first embodiment of the present invention, a tag is attached to each container and each dolly. Furthermore, an association is created in a computer database between the unique identification number of each tag and the plastic container or dolly to which it is attached. For example, such database might associate one unique tag number with a particular plastic container, while it associates another unique tag number with a particular dolly. In many cases, such database would be located on a server, accessible over the internet or another network.

Set Identification Detailed Discussion

The current invention provides a method of "identifying sets" of tagged items by applying certain rules to such items. Such rules are based on the "motion states" of the items, which denote the time frames during which such items variously are stationary, start in motion, stop motion, or continue in motion. Pursuant to the "start in motion" rule, tagged items that start in motion at the same time are identified as comprising a set.

A tagged item is deemed to start in motion at the moment when it transitions from a stationary state (standing still) to a moving state. Items are deemed to start in motion "at the same time" if they transition from a stationary state to a motion state within a predefined time frame, such as, within 1 second of each other.

For example, suppose that an RFID system detected the presence of 310 tagged items, 300 of which are comprised of containers and 10 of which are comprised of dollies. Furthermore, suppose that such 300 containers are, in fact, comprised within 10 nested stacks of 30 containers each and that each stack of containers sits atop one of the 10 dollies. As defined within a computer system, each such stack of 30 containers sitting atop a dolly would comprise a "set," an example of which is shown in FIG. 1A.

Assume that at the starting point of detection, all such 310 items were stationary. If one stack (and only 1 stack) of 30 containers atop a dolly began to move (such as would occur if the stack were pushed by a laborer), then all 31 tagged items (30 containers plus 1 dolly) would start in motion "at the same time." The motion sensors on the 31 relevant tags would detect the transition from stationary state to motion state and the appropriate data representing all 31 transitions would be transmitted from the tags to the reader within the applicable predefined time frame. Such data would include the unique identification numbers of the tags attached to the containers or dolly. Alternatively, such transition from stationary state to motion state could be detected by a Doppler detector, or by using the Doppler effect, or by analyzing properties of waves transmitted by RFID tags (such as polarity, phase, length, amplitude, other properties, and combinations of such properties). Other states of motion (such as "continuing in motion" or "stopping motion," as described below) could be detected by the same means as set forth here.

Such data would then be communicated by the reader to a computer that: (i) could access the appropriate database and (ii) contained an application for interpreting such data according to a set of rules. One rule governing identification of a set might effectively provide that if 30 tagged containers and 1 tagged dolly all start in motion within 1 second of each other, and such 31 items are the only tagged items that start in motion during that second, then such items are identified as a "set," comprised of 30 nested containers atop a dolly.

Another rule governing identification of a set might be based in "continuing in motion," referring to tagged items that are all continuously moving for a predefined period of time, such as 5 seconds. For example, suppose that a reader received data indicating that 62 tagged items had started in motion within the same 1 second period, and that 60 of such items were containers and 2 of them were dollies. If, subsequently, the reader received data indicating that 30 of such containers and 1 of such dollies had stopped moving while the other 30 of such containers and 1 of such dollies had continued moving for 10 continuous seconds, then a "continue in motion" rule would identify the latter 30 containers and 1 dolly as a "set," comprised of 30 nested containers atop a dolly.

Similarly, a "stop in motion" rule could be used to identify the 30 containers and 1 dolly that had stopped moving as a set. Such rule might effectively provide that if 30 tagged containers and 1 tagged dolly all stop in motion within 1 second of each other, and such 31 items are the only tagged items that stop motion during that second, then such items are identified as a "set," comprised of 30 nested containers atop a dolly.

Another rule governing identification of a set might provide that if certain quantities and/or types of tagged items start in motion within a predefined time frame, then no set is identified. For example, suppose that a first set of rules provides that (i) not more than one dolly may be positioned beneath a stack of containers and (ii) not more than 30 containers may be positioned atop a dolly. If 60 containers and 2 dollies start in motion within a predefined time frame (such as within 1 second of each other), then (pursuant to such rule) no set would be identified, since the start in motion rule could not be used to determine which containers were on which dolly.

Assuming the same rules and factors as set forth above, another rule governing set identification might identify a set consisting of 60 containers and 2 dollies (as an alternative to identifying "no set"). It would not be known, however, as to which containers were on which dolly.

Various motion state rules can be combined to reduce the possibility of error, and increase the probability that the sets identified under the rules actually exist and that the items comprising them are accurately identified. For example, a vibration caused by an impact could cause the motion sensors on a multitude of containers and a single dolly to detect motion, resulting in motion data for all such items being sent to the reader within a time frame of 1 second.

Under such circumstance, the start in motion rule, unto itself, might result in the items being identified as a set, even though that might not actually be the case (e.g., the containers might actually be located in several different stacks, or atop several different dollies—only one of which vibrated and sent motion data). A continuing in motion rule in combination with a start in motion rule might be used to reduce the likelihood of, or eliminate, such an error. Such combinations of rules might effectively provide, for example, that to be identified as a set, a group of tagged items must both (i) start in motion within the same 1 second period, and (ii) continue in motion together for at least 7 continuous seconds (or some longer period, if required to effectively "filter out" motion data resulting from vibration). Other combinations of motion state rules are also possible and are all within the scope of the present invention.

The preceding motion state rules could also be used to identify sets (or stacks) of dollies of the kind shown in FIG. 1C.

The preceding motion state rules can be used to identify (in real time) newly formed sets of items, as well as adjust (in real time) the quantities of items within a particular set. For example, assume that pursuant to a standardized business process, empty tagged containers are stored in nested stacks atop dollies ("container storage stacks") that start out with 30 containers to a stack, as shown in FIG. 1A. Also assume that empty tagged dollies are stored in stacks ("dolly storage stacks") that start out with 10 dollies to a stack. Pursuant to such standardized business process, the container storage stacks and dolly storage stacks are held in a designated location referred to as a "staging area."

Further assume that, pursuant to the standardized business process, nested tagged containers are, at some point, removed from the container storage stacks in sets of 1 to 10 containers at a time; placed atop a dolly (that had been taken from a dolly storage stack); and then pushed from the staging area to a location referred to as a "packing area" (where the containers are packed with various items).

Under such scenario, the preceding motion state rules could be used to identify (in real time) each newly formed set of 1 to 10 containers and a dolly; as such items were in the process of being pushed from the staging area to a packing area. Incident to such newly formed sets (or stacks) being identified; the quantities of items remaining in the existing sets of container storage stacks and dolly storage stacks could be adjusted downward. For example, if 5 containers and 1 dolly were removed from an existing container storage stack and dolly storage stack that had started out with 30 containers and 10 dollies, then the remaining quantities in such stacks could be adjusted downward to 25 containers and 9 dollies.

Quantity State Rules

The current invention provides a method of "attributing properties" (i.e., characteristics), to sets of tagged items by applying certain rules to such items. Such rules can be based on the "quantity state" of the items, which denote the quantity of items within a set. Pursuant to quantity state rules, various properties can be attributed to a set if the quantities of certain tagged items that comprise the set fall within certain ranges.

For example, assume that whenever a range of between 1 and 5 containers rests atop a dolly, then, pursuant to a standardized business process, the lids of such containers are in closed position and the floor of each container rests on the lid of the container immediately beneath it, except for the bottom container which rests atop the dolly (as shown in FIG. 1B). Also pursuant to such standardized process, such containers (with lids in closed position) are packed with contents and any stack of such containers, sitting atop a dolly, is referred to as a "packed stack." A relevant quantity state rule might effectively provide that if a range of 1 to 5 tagged containers and 1 tagged dolly are identified as a set, then such set shall be attributed with the property that it comprises a "packed stack."

Another quantity state rule might effectively provide that if between 11 and 30 tagged containers and 1 tagged dolly are identified as a set, then such set shall be attributed with the properties that it comprises a container storage stack in which the containers are nested inside each other and sit atop the dolly at the bottom of the stack. Another quantity state rule might effectively provide that if between 6 and 10 tagged containers and 1 tagged dolly are identified as a set, then such set shall be attributed with the property that it comprises a stack with respect to which it is undetermined as to whether such stack is configured as a packed stack or a container storage stack.

Quantity state rules could also be used to attribute properties to dollies. For example, one such rule might effectively provide that if a range of from 2 to 10 dollies is identified as a set, then such set shall be attributed with the properties that it comprises a dolly storage stack in which the dollies sit one atop another (in the manner shown in FIG. 1C).

In addition to being used to attribute properties, quantity state rules can also be used to identify circumstances in which no set should be identified. Using the above scenarios as examples, quantity state rules might be used to determine that no set should be identified in circumstances where: (i) more than 30 tagged containers (or more than 10 tagged dollies) start in motion at the same time, or (ii) more than 30 tagged containers (or more than 10 tagged dollies) continue in motion at the same time, (iii) more than 30 tagged containers (or more than 10 tagged dollies) stop in motion at the same time, or (iv) more than 1 dolly and a group of containers start in motion, continue in motion, or stop in motion at the same time.

Other quantity state rules and motion state rules could be promulgated, and the preceding quantity state rules and motion state rules could be modified in accordance with the requirements of various processes. Under certain circumstances, (i) motion states could be used to create rules that attribute properties and (ii) quantity states could be used to create rules that identify sets. Accordingly, such rules and states provide flexible and open-ended tools that should not be construed as being limited by the examples and scenarios set forth herein.

Mobile Cart Schematics

In one embodiment of the current invention, a Mobile Cart contains certain items of electronic equipment that, in cooperation with each other, are capable of wirelessly receiving data from tags and wirelessly communicating such data to a remote server. In one embodiment, the Mobile Cart carries its own onboard battery (typically about the size of a 12 volt car battery) for providing electrical power to such equipment. In a preferred embodiment, the Mobile Cart is also adapted to receive electrical power from a standard AC wall outlet.

Figure 2A:
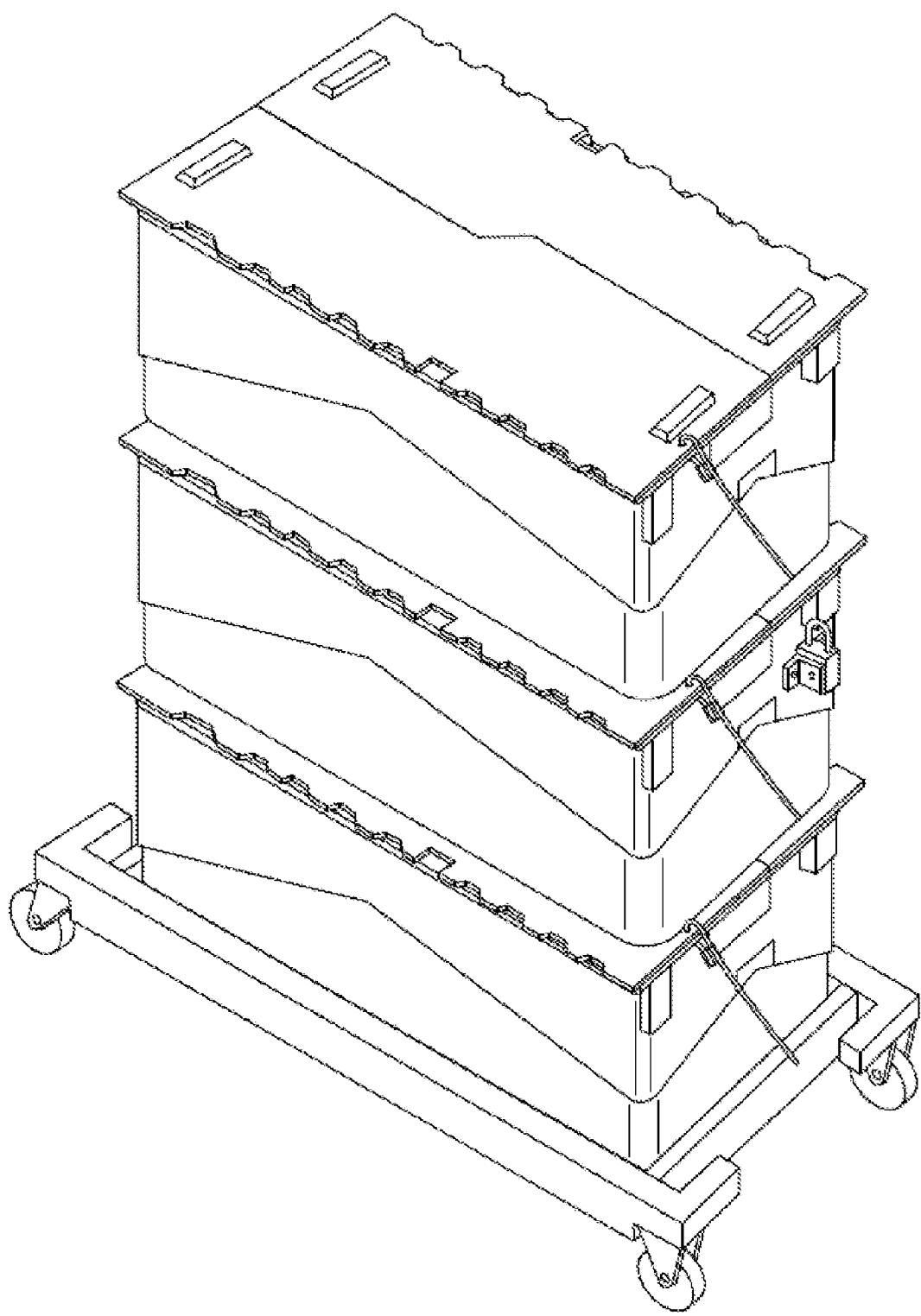
FIG. 2A shows an outside perspective view of one embodiment of the Mobile Electronic Cart.

FIG. 2A shows an outside perspective view of one embodiment of the Mobile Electronic Cart. In one embodiment, the outer housing of the Mobile Cart comprises a set of vertical sidewalls, a horizontal bottom wall (or floor) and a horizontal top wall (or lid) that enclose and protect the electronic equipment. A set of caster wheels beneath the floor allows the Mobile Cart to be manually pushed or rolled. Such outer housing comprises a relatively simple enclosure that is functionally and aesthetically suitable for use in an office or business environment (i.e., amidst employees who are performing common office functions such as using computers, talking on phones and holding meetings).

In one embodiment, the Mobile Cart is "mobile" in the sense that it can be easily transported aboard a truck and easily pushed (by hand) from one location to another inside an office building, warehouse, factory, hospital, or other similar environment. It is also mobile in the sense that using it requires no installation or setup, other than turning on a power switch and, where outside electricity is required, plugging-in a power cord.

Figure 2B:
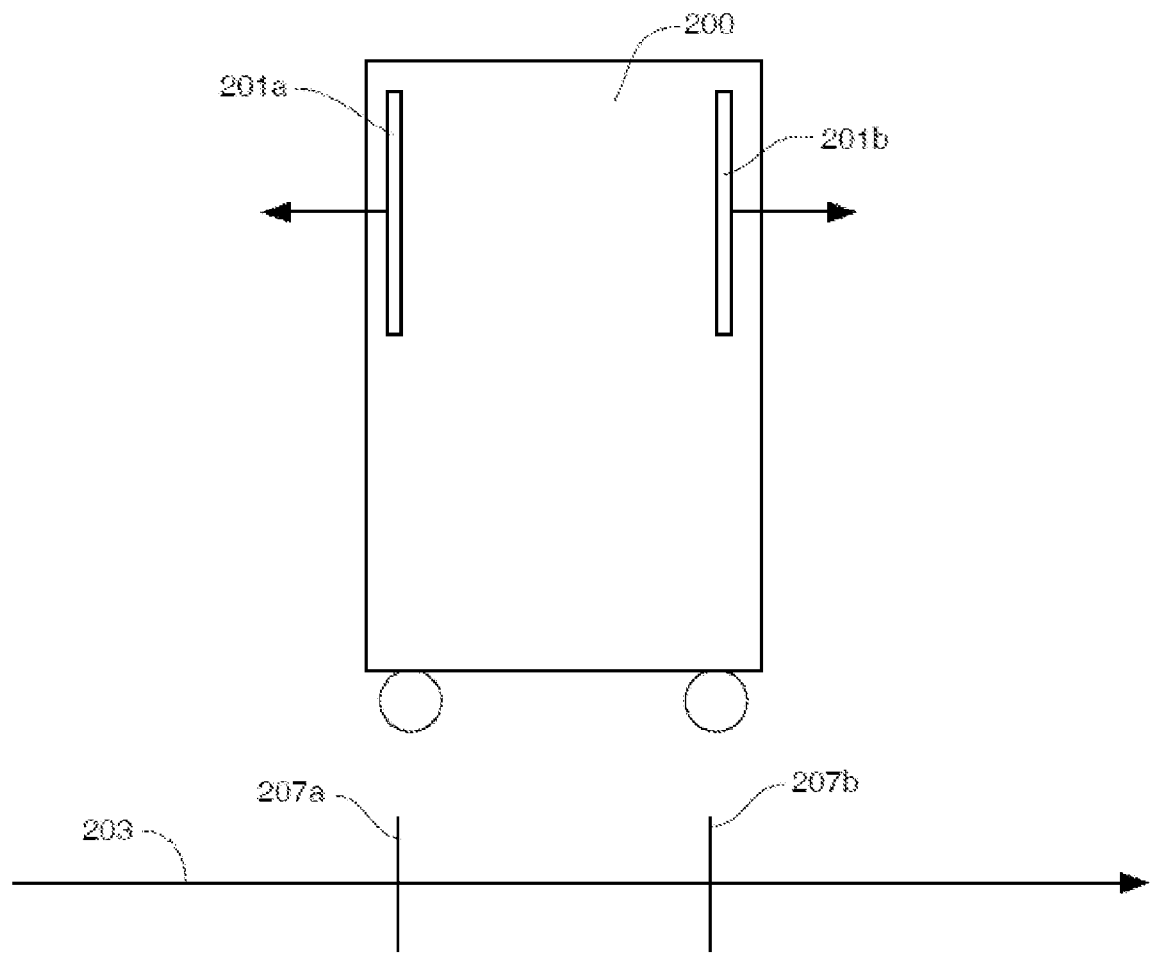
FIG. 2B shows a brief schematic of one embodiment of the Mobile Electronic Cart comprising a mobile RFID reader system having two antennas.

In one embodiment, an RFID reader is used to wirelessly receiving data from RFID tags. The RFID reader may comprise two antennas, each of which has "directional gain" (meaning that the antenna performs better in one direction than the other). In one embodiment, the two antennas are positioned inside the Mobile Cart facing in opposite directions, as shown in FIG. 2B. Accordingly, one antenna performs better in one direction and the other antenna performs better in the opposite direction.

FIG. 2B shows side views of oppositely facing antennas 201a and 201b on a Mobile Electronic Cart 200. FIG. 2B shows an arrow pointing from each such antenna, showing the direction from which it best radiates (or, alternatively, the direction from which it best receives radio waves transmitted by RFID tags). The Mobile Electronic Cart 200 is shown along line 203, with the first antenna at point 207a and the second antenna at point 207b.

Figure 2C:
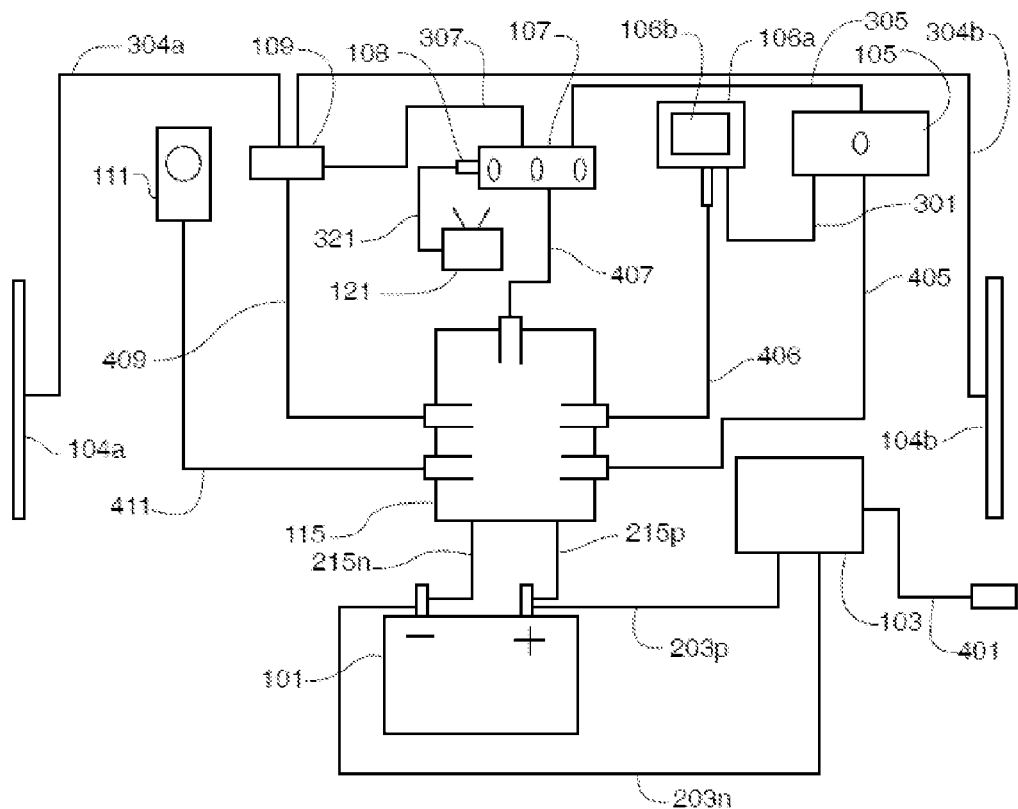
FIG. 2C shows a detailed schematic of one embodiment of the Mobile Electronic Cart.

FIG. 2C shows a schematic of a Mobile Electronic Cart according to one embodiment of the present invention. A battery 101 supplies DC electrical power to inverter 115 via wires 215n (connected to the battery's negative terminal) and 215p (connected to the battery's positive terminal). A battery charger 103 receives AC electrical power through power cord 401. The power cord 401 may have a multi-pronged plug attached to one end which may be plugged into a standard AC wall outlet. The battery charger 103 supplies DC electrical power to the battery 101 (via wires 203n and 203p) for purposes of recharging the battery 101. The inverter 115 supplies AC electrical power to infrared generator 111 via power cord 411; RFID reader 109 via power cord 409; router 107 via power cord 407; monitor 106a via power cord 406; and computer/media player 105 via power cord 405. The inverter 115 is an electrical converter that converts direct current into alternating current, (typically involving conversion of 12, 24, 36 or 48 volts of direct current from 120 or 240 volts of alternating current). The infrared generator 111 converts electrical power into infrared light waves.

The antennas 104a and 104b receive radio wave signals transmitted via RFID tags (not shown). The signals carry an encoded identification number that uniquely identifies each RFID tag. The RFID reader 109 receives the radio wave signals from antennas 104a and 104b, via cables 304a and 304b. The RFID reader 109 sends encoded electronic signals (which effectively carry the identification numbers of the RFID tags) to router 107 via cable 307 (e.g., an Ethernet cable).

A router 107 communicates the encoded electronic signals to an attached cellular modem 108. In an alternative embodiment, the functionality of the cellular modem 108 may be embedded within the router 107. The cellular modem 108 communicates such encoded electronic signals to cellular amplifier 121 via cable 321. The cellular amplifier 121 receives such encoded electronic signals and, acting as a "power amplifier," transmits amplified wireless cellular signals to a remote server (not shown) over the internet (and via the cellular network).

The remote server (not shown) receives the encoded electronic signal and (in accordance with the programmed instructions on such server) sends a wireless signal (via cellular) back to the cellular amplifier 121. The cellular amplifier 121 receives the encoded electronic signals and, acting as a "weak signal amplifier," communicates an amplified electronic signal to the cellular modem 108 via cable 321. The cellular modem 108 electronically communicates the encoded electronic signal to attached router 107, which in turn, electronically communicates the signal to computer 105 via cable 305. The cellular amplifier 121 is an electronic device that increases the amplitude, current, or power of a signal.

The computer 105 receives the electronic communication (from router 107) and (in accordance with the programmed instructions on computer 105) sends an electronically encoded signal (via cable 301) to monitor 106a, which displays an output (such as graphics and text) that can be read by a human being.

A touch screen 106b sits in front of the output display area of the monitor 106a. Variously touching the screen (e.g., with one's finger or a hard object such as a pen or stylus) sends a "user input" signal to computer 105. The precise user input signal sent depends upon the area in which the screen is touched. In alternative embodiments, a keyboard or mouse may be used in lieu of a touch screen.

In one embodiment of the present invention, an infrared generator 111 (alternatively referred to as a "locator device", as described above) transmits an encoded signal (or "beacon" or "beam") via infrared light. The signal effectively carries an identification number that uniquely identifies the particular infrared generator 111. The infrared signal excites or stimulates an infrared receptor (or "eye") located on each of the RFID tags (not shown). Each RFID tag has been adapted to receive and process an infrared signal. As a result of receiving such infrared light signal, each RFID tag transmits a radio wave signal, indicating that it has been excited or stimulated by an infrared generator 111 (pursuant to said infrared generator's unique identification number). As described above, infrared generator 111 would typically be positioned in a known or defined location, thereby effectively identifying the location of the stimulated RFID tag and any object to which such RFID tag is attached.

An "on-off" switch (not shown) may be inserted along wire 215n or 215p or both to variously enable or disable the flow of electrical current between the battery 101 and inverter 115.

In an alternative embodiment of the present invention, the cellular amplifier 121 could be eliminated. However, as a practical matter, in the application of office moving (as well as other applications), the cellular amplifier is important, as office buildings (and other types of buildings and structures) often have "dead zones" in which cellular signals are weak.

Infrared Location Determination

In one embodiment, the Mobile Cart includes at least one infrared locator device. As described above, such device is capable of transmitting an infrared signal (that carries the locator device's unique identification number) to an RFID tag that is adapted to receive and process such signal, and wirelessly transmit such identification number (along with the tag's own unique identification number) to an RFID reader (such tag is referred to herein as an "IR adapted RFID tag"). In turn, the reader would be adapted to communicate the identification numbers to another device such as a computer.

In one embodiment, the Mobile Cart comprises 2 locator devices, one of which transmits an infrared signal in one particular direction and the other of which transmits an infrared signal in a different direction. Under tests conducted by the current inventors, a Mobile Cart so enabled was oriented so that one such signal was transmitted in the direction of a particular zonal location, while the other such signal was transmitted in the direction of a different zonal location. The results of such test indicated that the tagged items in each zonal location received and transmitted the unique identification number (and only the unique identification number) of the locator device facing in the direction of the zone in which such items were located. Accordingly, it is possible to use a single Mobile Cart, comprising locator devices that transmit infrared signals in different directions, to determine the zone in which particular tagged items are located.

Various methods are available for "collimating" infrared signals or beams. A "collimated beam" is a beam that is relatively thin, or narrow, as compared to a non-collimated beam. Typically, the rays of collimated beams are nearly parallel to each other and spread slowly as they propagate. Commonly, mirrors and lenses are variously utilized to collimate infrared signals (other means of collimation are also available).

As a disclosure of the current invention, a locator device could be adapted to transmit a collimated infrared beam that carries the locator device's unique identification number to an IR adapted RFID tag. In one embodiment, such infrared beam would be vertically collimated, so that it effectively formed an "invisible curtain" across a defined area. Such curtain might be 10 to 20 feet high (or higher) and might extend horizontally (like a curtain across a floor) for a distance ranging anywhere from a few feet to few hundred feet, or further.

An IR adapted RFID tag passing through such vertically collimated infrared beam (or "invisible curtain") would wirelessly receive the unique identification number of the applicable locator device, and transmit such number (along with the tag's own unique identification number) to an RFID reader. In turn, such reader would communicate such identification numbers to another device such as a computer.

The defined area covered by the relevant "invisible curtain" formed by such collimated infrared beam would be stored in a database. Accordingly, a server with access to such database could determine that, at the moment that the unique identification number of the locator device was transmitted by the relevant IR adapted RFID tag, such tag (and any item to which such tag was attached) was located within the defined area covered by the relevant "invisible curtain" formed by such collimated infrared beam.

In one embodiment of the current invention, a first series of locator devices could be utilized to transmit vertically collimated infrared beams (referred to herein as the "first series of vertically collimated infrared beams"). Each beam in such first series of vertically collimated infrared beams would be parallel, or nearly parallel, to the other beams in such series, and would be spaced apart from any adjacent parallel (or nearly parallel) beam by a defined distance (such as 10 feet).

A second series of locator devices could be utilized to transmit vertically collimated infrared beams (referred to herein as the "second series of vertically collimated infrared beams") across the first series of vertically collimated infrared beams. Each beam in such second series of vertically collimated infrared beams would be parallel, or nearly parallel, to the other beams in such series, and would be spaced apart from any adjacent parallel (or nearly parallel) beam by a defined distance (such as 10 feet).

Since the first series of vertically collimated infrared beams and second series of vertically collimated infrared beams would cross each other, a grid-like pattern of vertically collimated infrared beams would be formed. In one possible embodiment, such crossing infrared beams would be perpendicular, or nearly perpendicular to each other. In other possible embodiments, such crossing infrared beams would non-perpendicular, and might form a diamond pattern or other patterns. In either case, such grid-like pattern would effectively create a series of cells in more or less the manner of a common spreadsheet.

Such cells would effectively comprise sets of columns and rows, each of which could be assigned a name so that any particular cell could be identified by its coordinated column and row names (e.g., a cell in column "G", row "37" would be identified as cell "G37"). Alternatively, such columns and rows could be referred to by their "x" and "y" coordinates.

An IR adapted RFID tag passing through any particular vertically collimated infrared beam within such grid-like pattern of beams would wirelessly receive the unique identification number carried by the applicable beam, and transmit such number (along with the tag's own unique identification number) to an RFID reader. In turn, such reader would communicate such identification numbers to another device such as a server.

If an IR adapted RFID tag passed through any set of vertically collimated infrared beams that crossed over each other (such as would occur with perpendicular, or nearly perpendicular, beams) then the relevant column and row could be identified and the cell in which such tag could be determined. Since the defined area covered by any particular cell could be stored in a database, the location of such tag could then be determined.

In another embodiment of the present invention, an infrared beam could be adapted to be horizontally collimated. In one application, one or more of such horizontally collimated infrared beams could pass through the aforementioned grid-like pattern of vertically collimated infrared beams. Such horizontally collimated infrared beams would effectively provide a third dimension (often referred to as a "z-coordinate") with respect to which the height of a tag could be determined. Combining such "z coordinate" with the aforementioned "x and y coordinates" would provide the ability to effectively define 3-dimensional cells.

In yet another embodiment of the present invention, it is possible to adapt a single locator device to transmit a plurality of collimated beams, each of which effectively carries its own identification number. Pursuant to such embodiment, one locator device could be effectively utilized in lieu of several such devices.

In one embodiment, the Mobile Cart would include at least one locator device that transmits a vertically collimated infrared beam. An IR adapted RFID tag could be deemed to have passed through a chokepoint when it passes through the vertically collimated infrared beam transmitted by any such locator device.

Although the preceding disclosure refers to infrared technology, the concepts embodied by such disclosure are not limited to the infrared portion of the electromagnetic spectrum. The disclosure is meant to encompass any and all parts of the electromagnetic spectrum (or any other spectrum) that can be adapted to wirelessly communicate data. Without limitation, such spectrum includes bandwidths commonly associated with radio frequency identification, cellular communication, Wi-Fi (802.11), Bluetooth, visible and invisible light waves and acoustical waves.

Doppler Effect

In one embodiment of the present invention, Doppler signals can be used to determine the relative motion, direction of motion, and speed of motion of an item to which an active, passive, or semi-passive RFID tag has been attached. Instead of relying on an integrated motion sensor or accelerometer to determine a motion state of an active tag, the Doppler Effect may be utilized to determine a motion state of an active, passive, or a semi-passive tag.

The Doppler frequency (or the magnitude of the "Doppler shift") is given by the formula $$\Delta f = (WV \cos \theta)/c \qquad \text{(Equation 1)}$$

where:

f is the frequency emitted by the source (e.g., the tag) when standing still;

$\Delta f$ is the change in frequency emitted by the source (e.g., the tag), such change comprising the difference between (i) the frequency emitted when the source is standing still and (ii) the frequency emitted at any particular point when the source is in motion;

W is the wavelength of the transmitted wave in the reference frame of the source (e.g., the tag) when such source is standing still;

V is the velocity of the source (e.g., the tag) relative to the receiver (e.g., the antenna attached to the Doppler detector);

$\theta$ ("theta") is the angle of incidence between the beam emitted by the source (e.g., the tag) and the line of sight between the source (e.g., the tag) and receiver (e.g., the antenna attached to the Doppler detector) (the "Angle of Incidence"); and c is the speed of wave (e.g., $3 \times 10^8$ meters per second for electromagnetic waves travelling in a vacuum, slightly less for electromagnetic waves travelling in air, and varying with respect to other mediums).

Transforming the above equation to solve for V (velocity of the source), the equation now reads:

$$V = c\Delta f/(W \cos \theta) \qquad \text{(Equation 2)}$$

Therefore, the motion state of a tag (the source) may be determined via the principles of the Doppler Effect by measuring the change in frequency ($\Delta f$).

With respect to the radio waves (such as those emitted by an RFID tag), (i) the frequency of said radio waves, (ii) any change in the frequency of said radio waves ($\Delta f$), (iii) the wavelength of said radio waves (W), and (iv) the speed of said radio waves are individually and collectively referred to herein as "electromagnetic properties of radio waves," or "electromagnetic properties of Doppler signals."

Change in frequency ($\Delta f$), as described above, is the hallmark of the Doppler effect (or Doppler shift). Such change equals the difference between (i) the frequency of the radio waves transmitted by a tag when such tag is in motion and (ii) the frequency of the radio waves transmitted by a tag when such tag is stationary. In accordance with the Doppler effect, the frequency of the radio waves received by an antenna from a tag will change when either: (i) such tag transitions from a stationary state to a motion state or (ii) the angle of incidence changes while such tag is in motion. In the latter case, the frequency received by an antenna from a tag will continuously change as the angle of incidence continuously changes in accordance with the movement of the tag (and any object to which such tag is attached).

The invention disclosed herein is not dependent upon any particular method or formula for determining velocity (V), $\Delta f$, $\cos \theta$, the Angle of Incidence, or any other factors set forth herein. The methods and formulas utilized herein are only for purposes of exemplification. Other methods or formulas that could be utilized are within the scope of the present invention.

Doppler Signal Detector

As used herein, the term "Doppler signal detector" (or "Doppler detector") includes all "designs, means and mechanisms" by which either: (i) detection and processing of Doppler signals can be achieved or (ii) the motion state of an RFID tag can be determined based upon properties of waves transmitted by said RFID tag including such properties as polarity, phase, length, amplitude, other properties, and combinations of such properties.

In one embodiment, such designs, means and mechanisms comprise incorporating a separate Doppler signal detector into an RFID system (such RFID system comprising an RFID tag and an RFID reader).

In another embodiment, such designs, means and mechanisms comprise providing an RFID reader with the necessary circuitry (such as motion detection circuitry or Doppler signal detection circuitry) to enable it to detect the difference between Doppler signals and incoming baseband signals, and to separate the Doppler signals for processing. Such Doppler signals and incoming baseband signals may be sent to mixer (or other device) where the frequency of at least one of such signals is converted to a different frequency. The Doppler signal may be processed separately by a digital signal processor and may be analyzed by a computer to determine such information as the relative direction and speed of the item to which an RFID tag is attached. Such necessary circuitry may be located either (i) within such RFID reader or (ii) between such RFID reader and an antenna.

In another embodiment, such designs, means and mechanisms comprise directing an incoming signal to a digital signal processor without the Doppler signals being filtered out. In such embodiment, the digital signal processor includes the necessary logic to detect, extract and process the Doppler signals, rather than the hardware required to extract the Doppler signals from the baseband signals.

In another embodiment, such designs, means and mechanisms comprise a first digital signal processor to filter out and process the Doppler signals and a second digital signal processor to process the baseband signals.

The present invention is not limited to any particular method of extracting and processing Doppler signals from incoming baseband signals. The present invention includes all designs, means and mechanisms of creating a Doppler signal detector based in hardware, software, or a combination of hardware and software.

Alternatives to the Doppler Effect

The Doppler Effect essentially capitalizes upon reliable variations in wave frequency (of radio waves, sound waves and other wave forms) as a function of the velocity, direction, and/or Angle of Incidence emitted or reflected by a source. The present applicants hereby disclose the possibility that reliable variations in the frequencies and other properties (electromagnetic and otherwise) of waves may be achievable as a function of factors other than the foregoing. In manners similar to those described above, such variations might then be utilized to determine factors such as velocity (V), Δf, Cos θ, Angle of Incidence, and source location.

Factors identified by the present inventors as candidates for either causing or being the effect of such variations include, without limitation, changes in wave: (i) polarity, (ii) phase, (iii) length, and (iv) amplitude. All such possibilities are within the scope of the present invention. Utilization of the Doppler Effect and of the above alternatives to the Doppler effect in conjunction with the above disclosed systems and methods are within the scope of the present invention.

Short-Range Chokepoint

RFID tags with relatively short transmission ranges (e.g., 10 to 30 feet) are typically used for purposes of determining if the items to which they are attached have passed through a chokepoint. RFID tags with relatively long transmission ranges (e.g., 100 to 300 feet) are typically used for purposes of determining if the items to which they are attached are present within an area, such as a warehouse, factory or office building. In one embodiment of the present invention, tags with relatively long transmission ranges can be attached to the containers (boxes), while a tag with relatively short transmission range can be attached to the dolly (or carrier).

The long transmission range tags (on the containers) would be used to determine presence in an area, whereas the short transmission range tag (on the dolly or carrier) would be used to determine passage through a chokepoint. Utilizing this method in combination with set identification (to know which boxes are aboard which dolly), presence within an area and passage through a chokepoint could be variously determined for an entire stack including both the dolly and containers stacked atop it. The same concept applies to pallets and items that may be stacked atop it. An RFID tagged item is typically deemed to have "passed through a chokepoint" when it passes a designated RFID antenna located along such item's path of travel.

Assuming that the tag on the dolly had a range of 10 feet, one could reliably determine when a particular stack was within 10 feet of the cart, i.e., if the reader on the cart sees the low range dolly tag, then the entire stack must be within 10 feet of the cart. Such determination could be made even though the container tags have a range significantly in excess of 10 feet (e.g., 300 feet).

The determination that a particular set of containers and a dolly were in a single stack would be based upon the set identification rules (e.g., boxes and dollies that start, stop or stay in motion at the same time are in the same stack, subject to certain sub-rules such as (i) limiting the number of boxes that can be in a single stack, and (ii) discarding data when multiple dollies start in motion at the same time).

Based upon the above, in one embodiment of the present invention, one might implement any one of the following rules:

(i) any stack within 10 feet of the reader is deemed to have gone through the chokepoint;

(ii) any stack within 10 feet of the reader and in motion is deemed to have gone through the chokepoint; or (ii) any stack within 10 feet of the reader and in motion and excited by the infrared locator device is deemed to have gone through the chokepoint.

Accordingly, the low range tag on the dolly would allow one to determine if a stack has gone through a chokepoint, while the long-range tags on the containers would allow one to determine if particular containers are present within a relatively large area (e.g., 35,000 square feet). In a practical scenario, there would likely be a long-range tag on the dolly in addition to the low range tag.

Weak Edge Chokepoint

The electrically conductive element of a patch antenna is essentially a metallic sheet (looks like a sheet of aluminum foil), typically in the shape of a rectangle. The sheet has 3 physical sides: (i) a broad front surface, (ii) a broad back surface, and (iii) a narrow edge. The narrow edge is approximately a few thousandths of an inch thick. The RSSI on both the front surface and back surface are relatively strong. On the other hand, the RSSI of radio waves received along the narrow edge of the antenna is quite weak. The weak edge is essentially a "blind spot" for the patch antenna. Virtually all other types of antennas have blind spots.

During the inventor's RFID tests, the inventors have pushed a stack of tagged containers towards a patch antenna, walking in a straight line towards the weak edge (i.e., walking co-planar with the weak edge). Under that condition, the RSSI values are quite weak.

Continuing to walk in a straight light (with slight deviation), the inventors cross the line (or plane) of the weak edge. Crossing that line, the inventors arrive at point which is directly in front of the front surface of the patch antenna. All of a sudden, the RSSI value increases substantially.

Continuing to walk, the inventors cross the far edge of the patch antenna; arriving again in the weak edge area, and the RSSI value falls dramatically. Accordingly, an "A-shape" pattern is obtained by exploiting the weak edge. The delta between the high and low RSSI values of such "A-shape" are greater (and more distinctive) than simply pushing a stack of tagged containers past a patch antenna—but not "walking" along the line of the weak edge.

Accordingly, according to one embodiment of the present invention, the "weak edge A-pattern" may be utilized alone, or in combination with the other disclosures of the present invention, for the purposes of determining when a set of RFID tags has moved past a chokepoint.

Received Signal Strength Indication (RSSI) Chokepoint

In the present disclosure, "received signal strength indication" (RSSI) is a measurement of the power density of the radio signal received by an antenna (that is typically attached to a reader) from a tag. "Zonal location" refers to the particular "zone" in which a tagged item is located, within a defined area that has been subdivided into a plurality of zones. Many efforts have been made to determine the zonal location of tagged items based upon RSSI values. In most cases, such efforts are based, in one form or another, on converting RSSI values into measurements of distance (such as "feet") from an antenna. However, the success of such efforts has been marginal at best.

One reason for this is that RSSI values often vary greatly from tag to tag, even when such tags are located right next to each other. Accordingly, efforts to convert RSSI values into reliable measurements of distance from an antenna have been largely thwarted by such tag-to-tag variance. Another reason is that in many practical applications, the direction from which the radio signal (and attendant RSSI value) was received is unknown. As a result, there has not been good success to date in utilizing RSSI values to determine location.

In light of such difficulties, most efforts to determine location based upon RSSI values have centered on locating tagged items while they are in a stationary state. RSSI has not been widely regarded as a viable means for determining the changing locations of tagged items while they are in a mobile state, as that would seemingly be even more difficult than determining stationary location.

The current invention discloses means of variously utilizing RSSI values to determine location of tagged items when they are in either a stationary or mobile state. Means of determining zonal location, passage through a chokepoint, and precise location (e.g., within a few feet) are disclosed.

The current invention discloses one embodiment of a process and a method to determine if tagged items have passed through a chokepoint. The process involves a particular manner of positioning the Mobile Cart. The method involves certain means of collecting and interpreting RSSI data, and is related to the process regarding the manner of positioning the Mobile Cart.

In determining if tagged items have passed through a chokepoint, the Mobile Cart should be located on (or near) the path along which the tagged items are traveling. When the relevant tagged items move past the Mobile Cart, they will be deemed to have moved past the chokepoint. As hereby disclosed by the current invention, for advantage in determining if the tagged items have moved past the chokepoint, the Mobile Cart should be oriented so that one antenna is facing toward the direction from which the tagged items are coming (the "direction of approach") and the other antenna is facing away from such direction (the "direction of retreat").

As illustrated in FIG. 2B, arrow 203 points to the direction in which tagged items travel along the aforementioned path (from left to right). Travel from the far left side of arrow 203 to line 207a constitutes movement in the direction of approach. Travel from line 207b to the far right side of arrow 203 constitutes movement in the direction of retreat. The reason that positioning the Mobile Cart in such manner is advantageous will become apparent in the following sections regarding RSSI values.

The current invention provides two methods of utilizing RSSI values to determine if tagged items have moved past a chokepoint. Both methods involve collecting a series of successive RSSI values as tagged items moving along the relevant path approach the chokepoint, move past the chokepoint, and move beyond the chokepoint. Also, both methods involve interpretations of the patterns created by plotted graphs of such collected RSSI values. The first of such methods is based in what is referred to herein as the "chokepoint pattern" or "A-pattern"; the second of such methods is based in what is referred to herein as the "crossover pattern" or "X-pattern."

The current invention provides two methods of utilizing RSSI values. As explained above, prior efforts to determine location based upon RSSI values have centered on locating tagged items while they are in a stationary state. As such, the manner in which RSSI values have been used has been "absolute," meaning that each value has stood on its own as a hypothetical indicator of a particular tag's distance from an antenna. An advance offered by the current invention is the use of RSSI values in a manner that is "relative," meaning that each such value for a particular tag (or group of tags) is viewed "relative" to the other such values for the same tag (or group of tags). As further developed below, use of RSSI values in a relative manner provides meaningful information as to the changing locations of tagged items while they are in a mobile state, such as occurs when tagged items are in the process of passing through a chokepoint.

In a preferred embodiment of the current invention, readings of RSSI values are taken at defined time intervals as a tagged item (or group of tagged items) moves along a path leading to a chokepoint. As examples of defined time intervals, a reading might be taken every 3 seconds or every 5 seconds. Each such reading is plotted as a data point on an x and y coordinate graph, where x represents the defined time intervals (increasing from left to right) and y represents the RSSI value (power present in the received radio signal increasing from bottom to top). The successive data points are then connected by a series of lines to bring forth the patterns created by the data points.

Actual RSSI Test Results

In actual tests conducted by the current inventors, readings of RSSI values were taken as tagged items moved along a path leading to a chokepoint. The tagged items utilized for such purpose were the nestable plastic containers and compatible dollies. The Mobile Cart (comprising two oppositely facing antennas attached to a reader) was located on the path along which the tagged items were traveling. Such Mobile Cart was positioned so that one antenna was facing the direction of approach and the other antenna was facing the direction of retreat. Such antennas were approximately 2 feet apart from each other.

RSSI readings were taken when a stack of tagged items was at various distances from the antennas inside the Mobile Cart, assuming the stack of tagged items was moving at a constant velocity towards the antenna. Each such reading was plotted as a data point on an x and y coordinate graph, where x represented the distance from the antenna and y represented the RSSI value. The successive data points were then connected by a series of lines to bring forth the pattern created by the data points. One particular set of test results is shown in the various charts in FIGS. 3B to 4B.

The charts in FIGS. 3B to 4B show the actual test results for a packed stack of several tagged containers (RFID tag numbers 800, 802, and 804) sitting atop a tagged dolly, as such stack moved through a chokepoint. Such stack is referred to herein as Stack 806. In such test, Stack 806 "started in motion" 50 feet from the center point between the oppositely facing antennas inside the Mobile Cart, and was pushed in a straight line toward the cart (i.e., pushed 50 feet in the direction of approach). When Stack 806 reached the Mobile Cart, pushing was continued until such stack went 50 feet past the antennas (i.e., pushed 50 feet in the direction of retreat).

Traveling in the direction of approach, RSSI readings were taken when packed stack 806 was 50 feet, 30 feet, 10 feet and 0 feet from the center point between the antennas. The last of such measurements ("0 feet") was at the point at which stack 806 was standing directly in front of the Mobile Cart. Traveling in the direction of retreat, RSSI readings were taken at 10 feet, 30 feet and 50 feet from the center point between the antennas.

On the x-axis of the various charts in FIGS. 3A to 4B, the direction of approach begins on the far left side of each such axis (at "50 feet") and progresses to the center of the axis (at "00 feet"); the direction of retreat begins at the center of the axis (at "00 feet") and progresses to the far right side of the axis (at "50 feet"). The units of measurement (e.g., 50, 30, 10 and 00 feet) are shown at the top of each chart along the horizontal dimension. The antenna facing the direction of approach is referred to as "Channel A" and the antenna facing the direction of retreat is referred to as "Channel B."

The y-axis of the various charts in FIGS. 3A to 4B reflect RSSI values in units of "decibels," such units comprising negative numbers with respect to which a lower absolute number indicates a stronger signal strength and a higher absolute number indicates a weaker signal strength. For example, an RSSI value of −40 decibels represents a stronger signal strength than an RSSI value of −50 decibels. Accordingly, received signal strength increases going from the bottom to the top of the y-axis of the various charts in FIGS. 3A to 4B. In the radio frequency field, RSSI values are sometimes measured in units other than decibels.

Ideal Chokepoint Pattern ("A-Pattern")

Figure 3A:
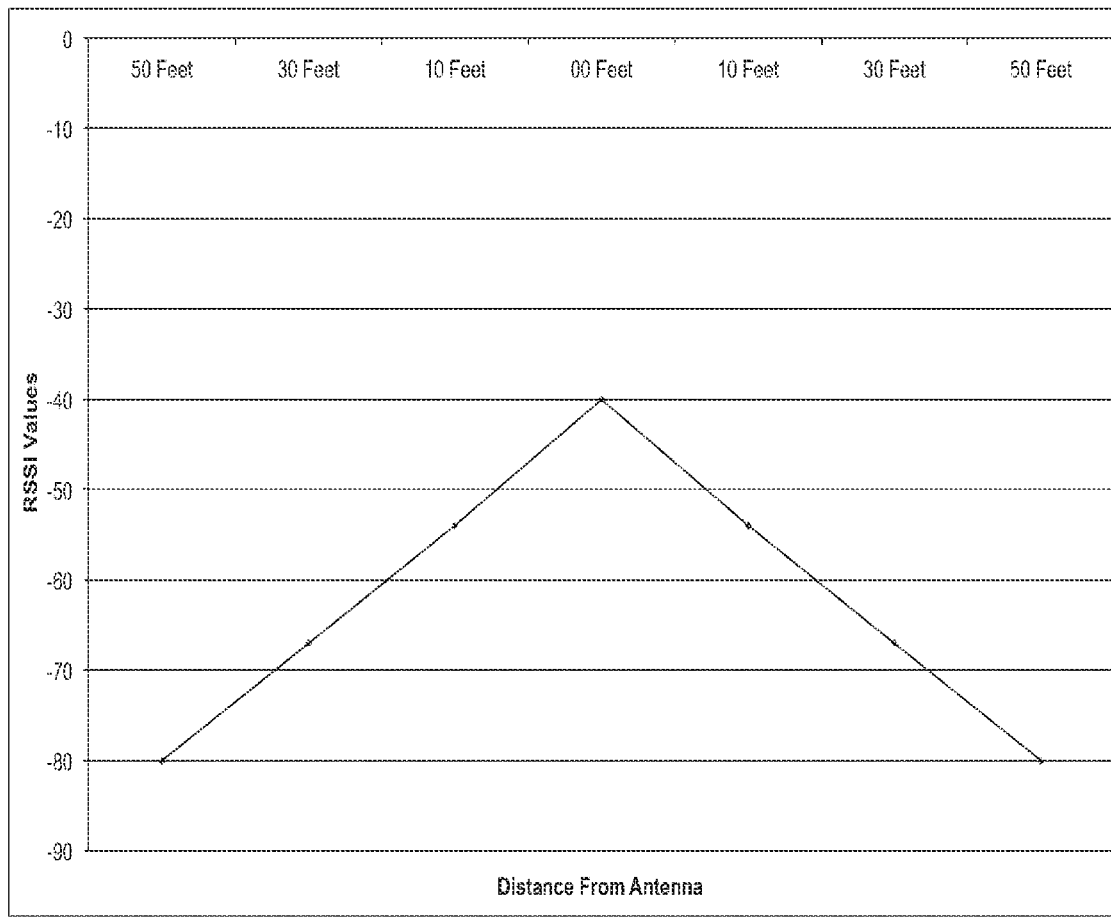
FIG. 3A shows an ideal chokepoint pattern ("A-pattern"), according to one embodiment of the present invention.

FIG. 3A shows a theoretical "Ideal Chokepoint Pattern" in which the RSSI value consistently rises as a tagged item (or group of tagged items) traveling along the direction of approach, and then consistently falls as travel continues along the direction of retreat. The high-point is reached at "00 feet" when the tagged item(s) are standing directly in front of the Mobile Cart.

Such "ideal chokepoint pattern" might be variously described as an "A-Pattern", "Convex Shape" or an "Upwardly Pointing Arrowhead." Another embodiment that would approximate such ideal shape would be more curved (and less angular) at the top and could be variously described as a "dome," "arc," "arch," "bowed," "vaulted" or "mound" shape.

Another way of describing the ideal chokepoint pattern is in terms of a series of "upticks" followed by a series of "downticks." An "uptick" is an RSSI value that represents an increase in received signal strength relative the immediately preceding RSSI value; a "downtick" is an RSSI value that represents a decrease in received signal strength relative to the immediately preceding RSSI value.

In the direction of approach segment of the chart in FIG. 3A, the "30 feet" value is an uptick relative to the immediately preceding "50 feet" value; the "10 feet" value is an uptick relative to the immediately preceding "30 feet" value and the "00 feet" value is an uptick relative to the immediately preceding "10 feet" value. Similarly, in the direction of retreat segment, the "10 feet" value is a downtick relative to the immediately preceding "00 feet" value; the "30 feet" value is a downtick relative to the immediately preceding "10 feet" value and the "50 feet" value is a downtick relative to the immediately preceding "30 feet" value.

Illustrative Example of the RSSI Chokepoint

The ideal chokepoint pattern provides a standard of comparison against which a determination can be made as to whether an actual tagged item (or group of tagged items) has passed through a chokepoint. Various mathematical models, formulas, rule sets or other methods of analysis could be utilized for purposes of making such determination. As one example of such a method, a tagged item (or group of tagged items) could be deemed to have passed through a chokepoint if a minimum of 3 successive upticks is followed by a minimum of 3 successive downticks.

Figure 3B:
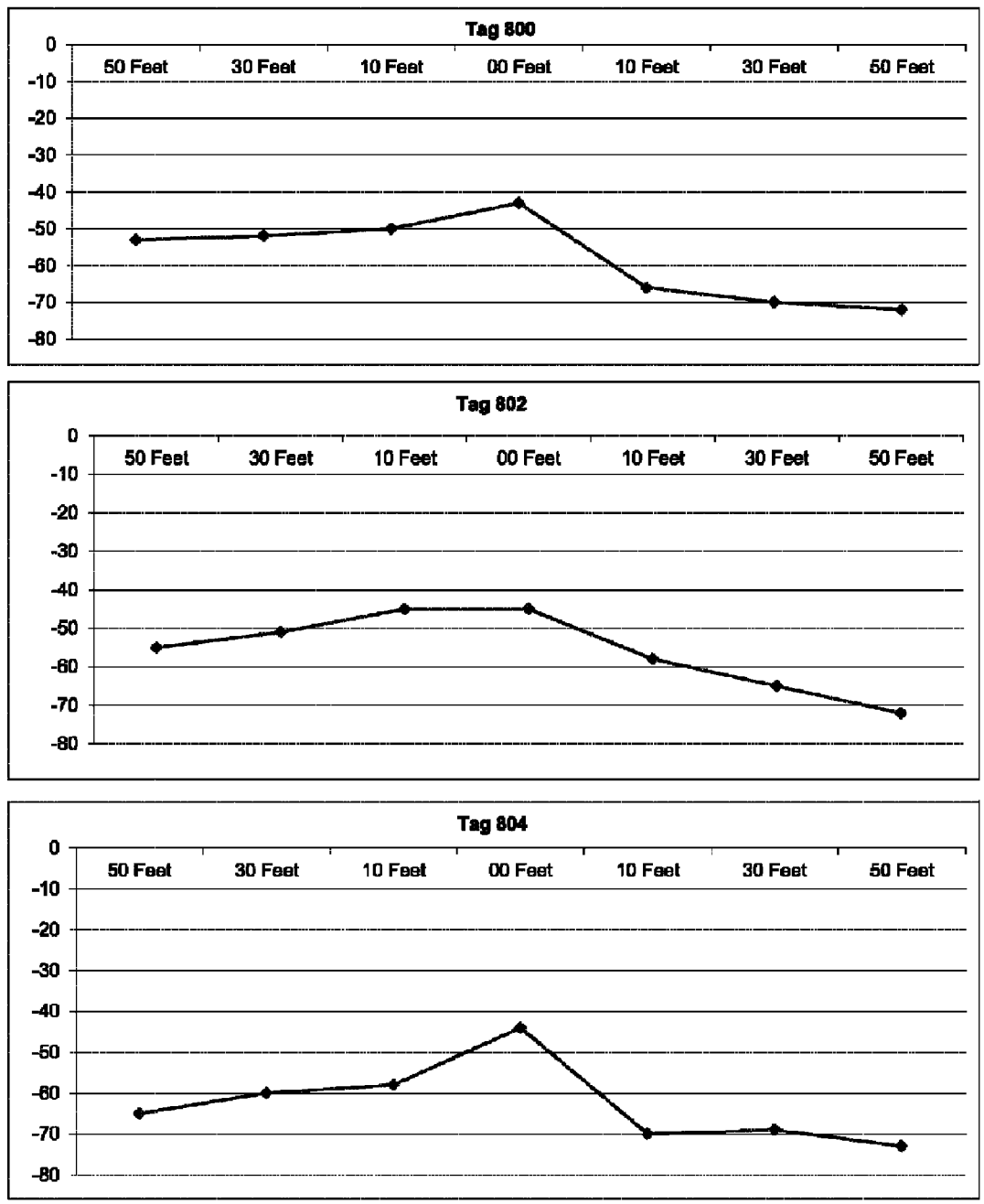
FIG. 3B shows samples of actual chokepoint patterns using only a single channel ("Channel A")

FIG. 3B shows the actual RSSI values recorded for each tagged item in Stack 806 using the Channel A antenna only (i.e., the antenna facing the direction of approach) as such stack passed through a chokepoint. Tag 800 (in FIG. 3B) shows 3 successive upticks followed by 3 successive downticks. Accordingly, Tag 800 would be deemed to have passed through the chokepoint pursuant to the 3 successive up/down criteria. On the other hand, Tag 802 only shows 2 successive upticks in the direction of approach. Accordingly, Tag 802 would not be deemed to have passed through the chokepoint pursuant to the 3 successive up/down criteria.

Figure 3C:
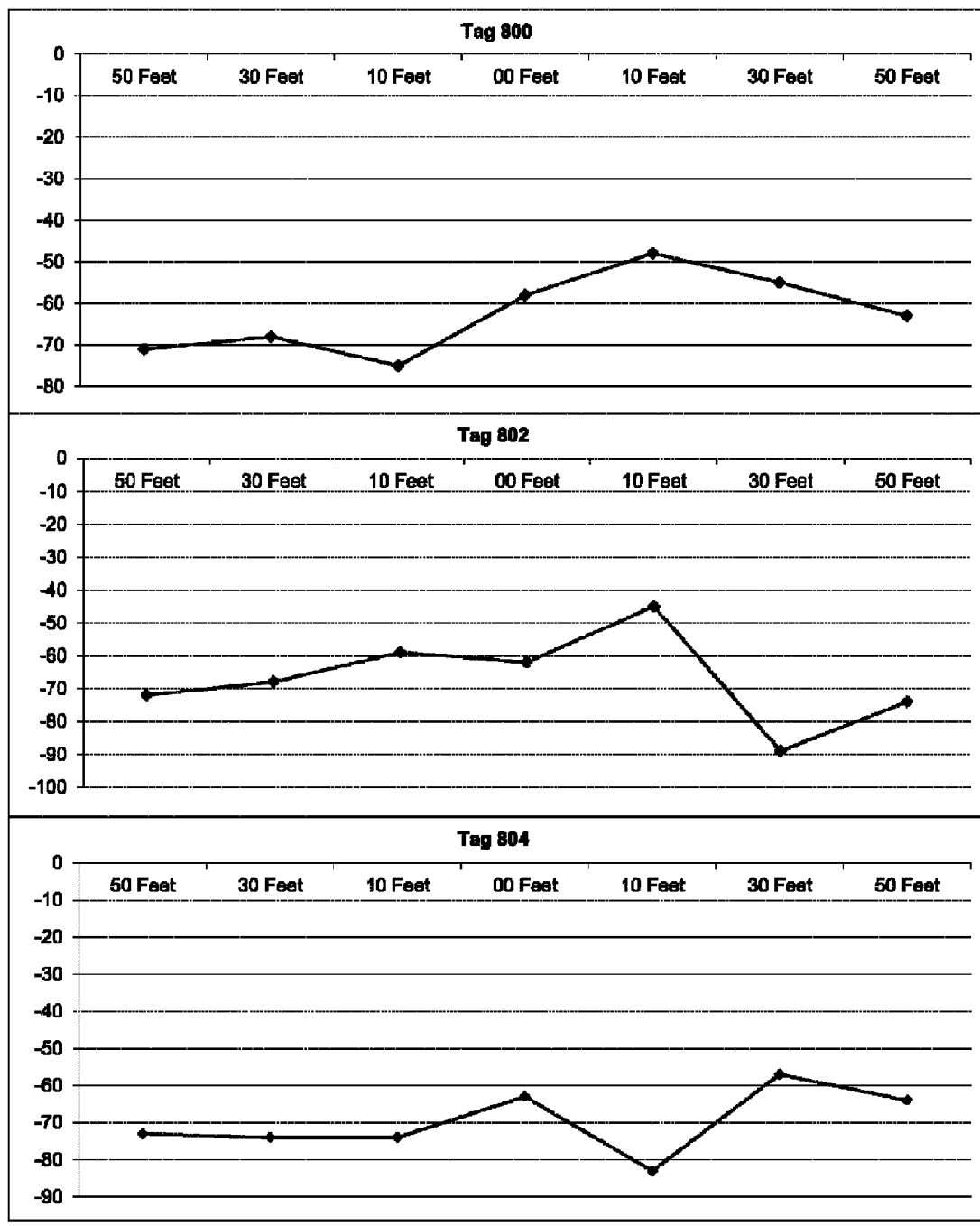
FIG. 3C shows samples of actual chokepoint patterns using only a second channel ("Channel B")

FIG. 3C is the same as FIG. 3B, except that it shows the RSSI values recorded for the Channel B antenna only (i.e., the antenna facing the direction of retreat). As Tag 800 does not show 3 successive upticks (in FIG. 3C); it would not be deemed to have passed through the chokepoint pursuant to the 3 successive up/down criteria. This is the case, even though Tag 800 would have been (correctly) deemed to have passed through the chokepoint using the RSSI values of the Channel A antenna (under FIG. 3B).

Figure 3D:
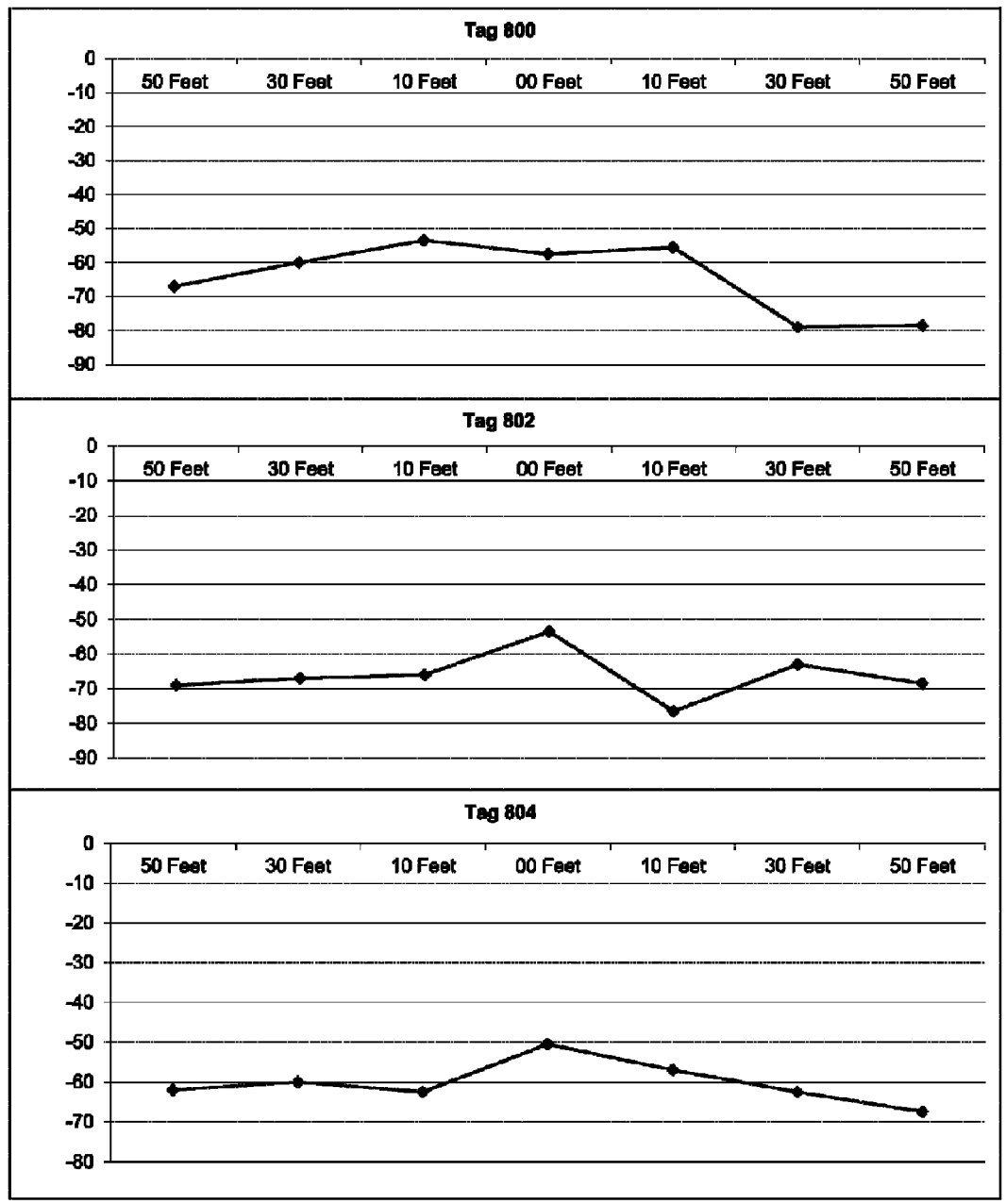
FIG. 3D shows samples of actual chokepoint patterns using an average of two channels ("Channels A and B Averaged")

FIG. 3D shows the results of averaging the RSSI values reflected in FIGS. 3B and 3C (i.e., averaging the values of the Channel A and B antennas). Using such averaging, Tag 800 would not be deemed to have passed through the chokepoint pursuant to the 3 successive up/down criteria (even though it had, in fact, passed through the chokepoint).

Figure 3E:
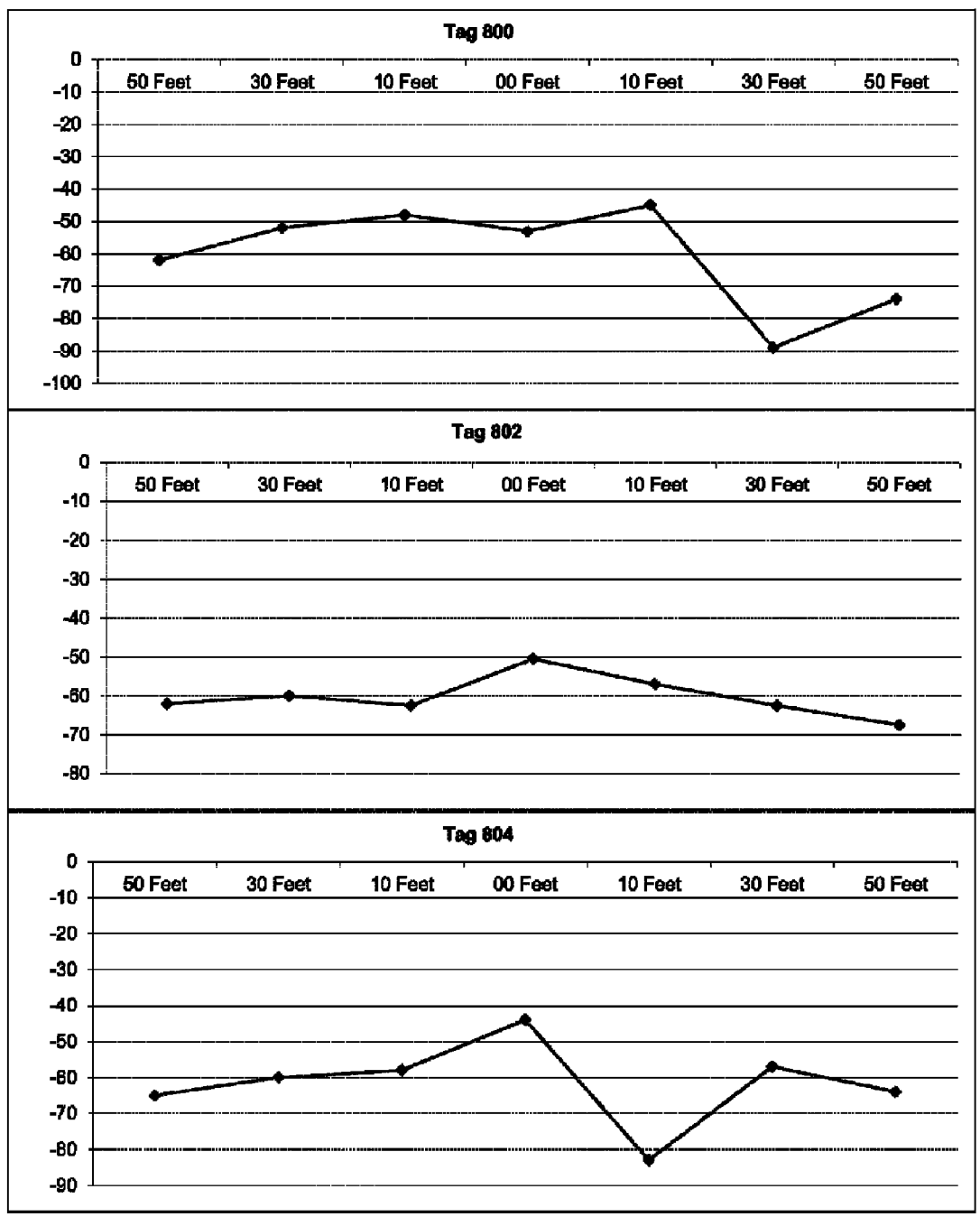
FIG. 3E shows samples of actual chokepoint patterns using Channel A on approach, and Channel B on retreat.

FIG. 3E show the results of using the Channel A values only for the direction of approach and the Channel B values only for the direction of retreat. Utilizing such method, Tag 800 would not be deemed to have passed through the chokepoint pursuant to the 3 successive up/down criteria.

If one analyzed each of the 3 tags represented in the charts under FIGS. 3B thru 3E, one would find varying results as to whether such tags would be deemed to have passed through the chokepoint pursuant to the 3 successive up/down criteria. Since all 3 tags did, in fact, pass through the chokepoint, the results on a tag by tag basis would not be reliable.

Figure 3F:
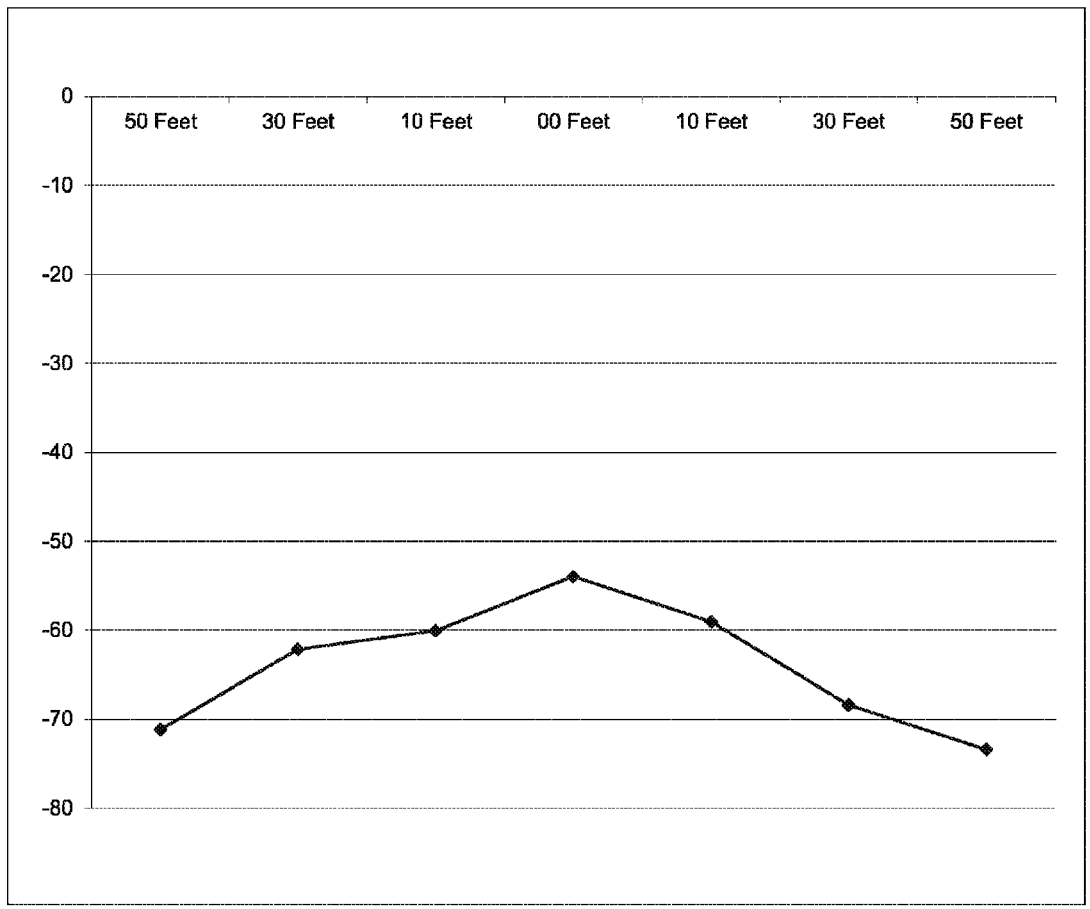
FIG. 3F shows a sample of an actual chokepoint pattern using an average of all tags across both Channels A and B.

On the other hand, as a disclosure of the current invention, if one averages the RSSI values of the 3 tags together, one can obtain attain a higher degree of reliability. The result of such averaging (for the 3 tagged items comprising Stack 806) is shown in the chart of FIG. 3F, which clearly shows 3 upticks followed by 3 downticks. Accordingly, such Stack 806 would be correctly deemed to have passed through the chokepoint pursuant to the 3 successive up/down criteria.

Furthermore, the overall shape of shown in FIG. 3F more closely resembles the ideal chokepoint pattern (shown in FIG. 3A) than any of the shapes shown in the charts of FIGS. 3B thru 3E. This is because averaging tends to smooth out the inconsistencies that are characteristic of RSSI values in general.

As a practical matter, such averaging is only possible where a "set" of tagged items can be identified. Accordingly, as stated above, the methods and procedures disclosed herein to identify "sets" of tagged items in real time can be used to improve the reliability of various determinations based in RSSI values. As exemplified herein, one such type of determination is whether a set of tagged items have passed through a chokepoint. Other types of determinations are possible.

Also, the methods and processes disclosed herein for attributing properties to sets of tagged items can further contribute to the reliability of various determinations based in RSSI values. For example, attributing a set of items with the property that it comprises a "packed stack" (in which all items within the set move together when such items are traveling), justifies the averaging of RSSI values for purposes of determining if such packed stack has passed through a chokepoint pursuant to a given criteria.

Other algorithms or set of rules could be used as criteria for making a determination as to whether a tagged item (or group of tagged items) has passed through a chokepoint. Relatively sophisticated mathematical methods could be used to describe various shapes or patterns, and make comparisons between an "ideal" and an "actual."

Furthermore, the particular criteria applied could be more stringent or less stringent than that exemplified by the 3 successive up/down criteria. For example, a less stringent criteria might specify a minimum of 2 successive upticks followed by a minimum of 2 successive downticks; or might eliminate the requirement that the various upticks and downticks be successive. A large number of variations are possible and are all within the scope of the present invention.

The method disclosed herein of comparison between an ideal and actual chokepoint pattern utilizes RSSI values in a manner that is "relative," rather than "absolute." Viewing RSSI values relative to other RSSI values (for the same tag or group of tags) forms the basis for defining patterns and criteria against which chokepoint determinations can be made. For example, the 3 successive up/down criteria is based upon a series of RSSI values, viewed relative to each other in degree of signal strength.

Defined Time Intervals

As indicated above, in one embodiment of the current invention, RSSI values would be read at defined time intervals (such as every 3 seconds) for purposes of determining if tagged item have move through a chokepoint. The ideal chokepoint pattern would be utilized, within the context of defined time intervals, to provide a standard (or basis) of comparison against which a determination could be made as to whether tagged items had passed through a chokepoint.

Accordingly, in the various charts of FIGS. 3A through 4B, the relevant defined time interval (e.g., 3 seconds, 6 seconds, 9 seconds, etc.) would appear along the x-axis in lieu of "feet," as in the current figures. In the same manner as described above, various mathematical or other criteria would be utilized for purposes of making a chokepoint determination.

Testing by the current inventors indicates that, for purposes of making such determination, a higher degree of reliability is attained if the RSSI values utilized are limited to those received during periods when tagged items are in motion (i.e., during periods when a tag's onboard "motion sensor" senses motion and transmits such information to a reader). Accordingly, if a set of tagged items were to start motion and stop motion while in the process of passing through a chokepoint, then only RSSI values received during periods of motion would be utilized for making a chokepoint determination.

Crossover Pattern ("X-Pattern")

Figure 4A:
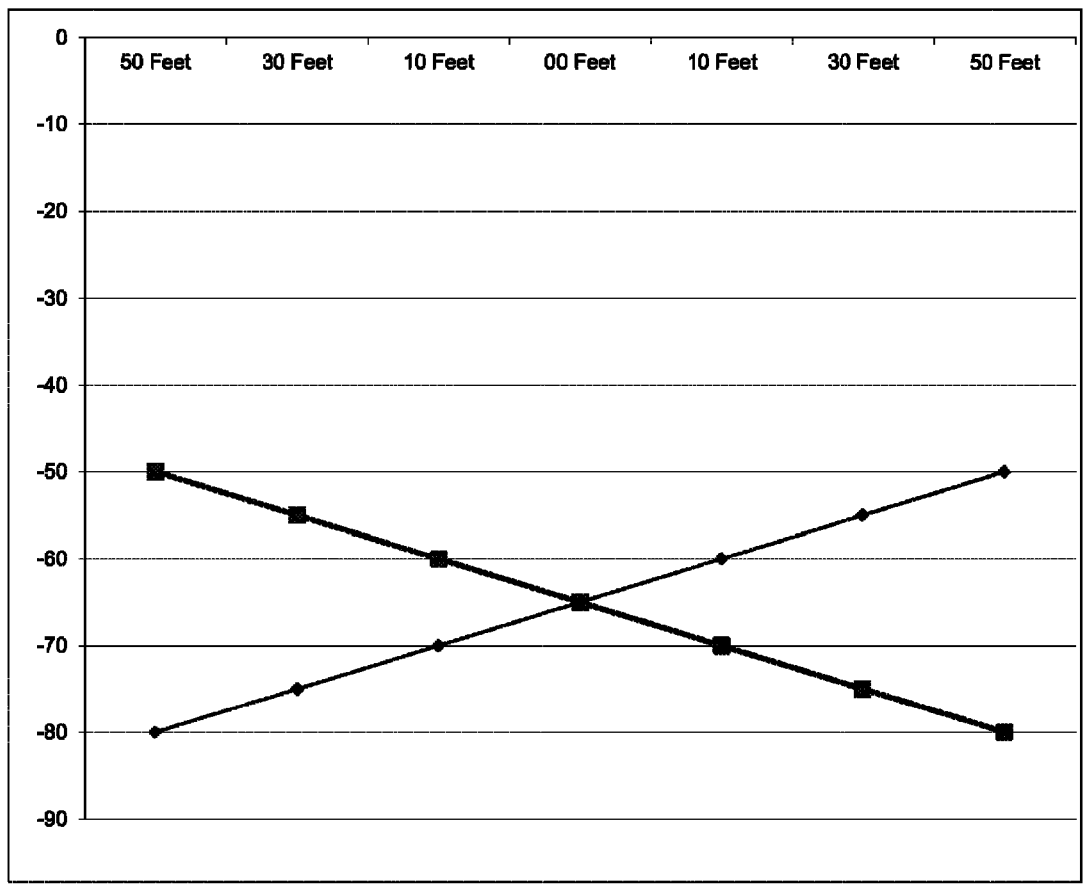
FIG. 4A shows an ideal cross-over pattern ("X-pattern"), according to one embodiment of the present invention.
Figure 4B:
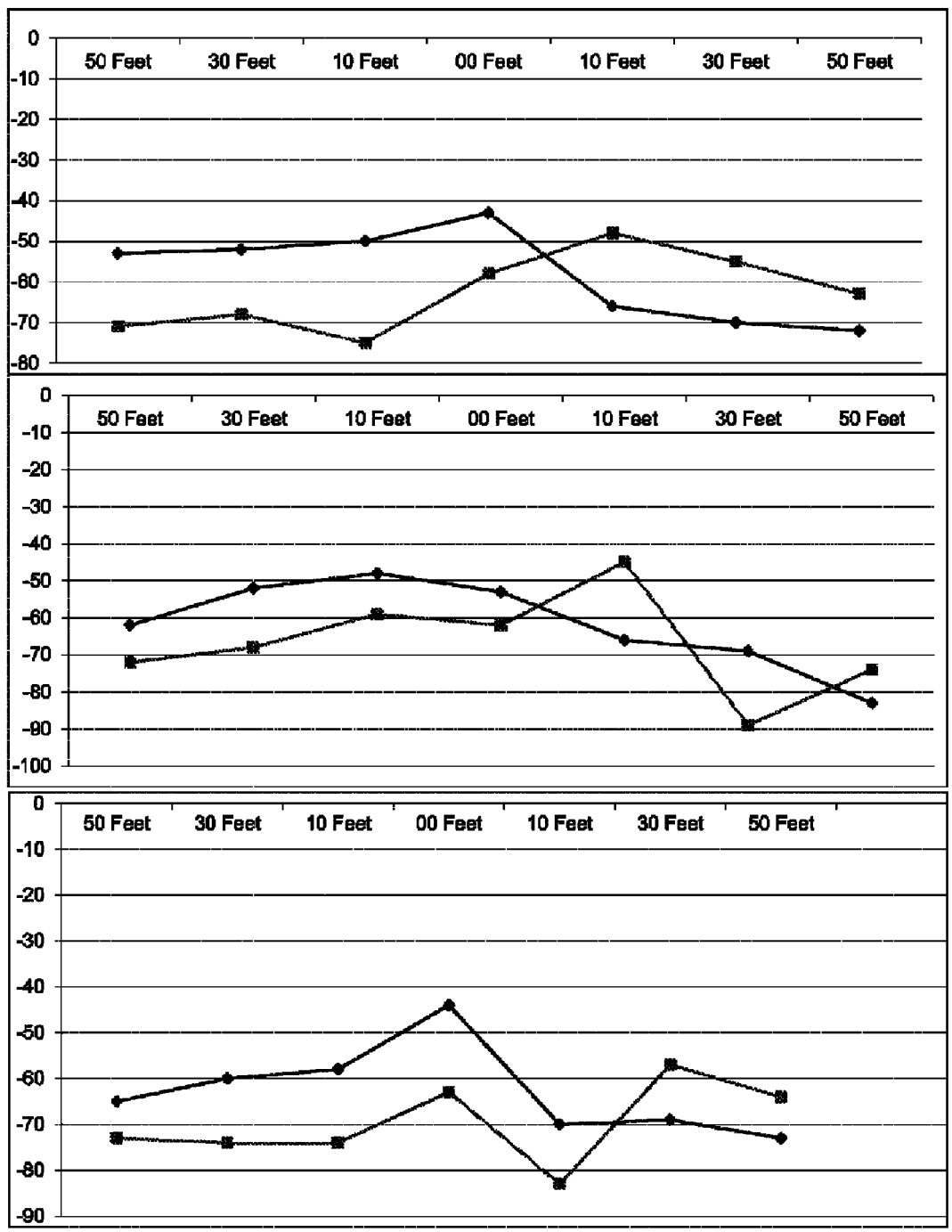
FIG. 4B shows samples of actual cross-over patterns for individual tags.

The charts in FIGS. 4A and 4B utilize the same data from the same tests as those of FIGS. 3B to 3F. Each chart in FIGS. 4A and 4B shows one line which represents the RSSI values received from the Channel A antenna (which faces the direction of approach) and a separate line which represents the RSSI values received from the Channel B antenna (which faces the direction of retreat). The data points for the Channel A and B antennas are represented as diamonds and squares, respectively. Unlike the "A-pattern" described above, which does not show the direction a set of containers is moving past a chokepoint, the "X-pattern" shows the direction in which a set of containers is moving past the chokepoint.

As shown in each of such charts, the lines representing the Channel A and B antennas "cross-over" each other (i.e., form "crossover patterns" or "X-patterns") at a point near the center of the chart (i.e., at a point near "00 feet"). Such phenomenon is explained by the fact that, since the Channel A antenna faced the direction of approach, such antenna received the stronger signal when packed stack 806 was approaching the Mobile Cart located at the chokepoint. Since the Channel B antenna faced the direction of retreat, such antenna received the stronger signal when packed stack 806 was retreating from the Mobile Cart located at the chokepoint. Accordingly, as packed stack 806 moved past the Mobile Cart (at a point near "00 feet"), the lines representing plots of the resulting RSSI values form crossover patterns.

Such crossover patterns provide a standard for defining criteria against which a determination can be made as to whether a tagged item (or group of tagged items) has passed through a chokepoint. A tagged item (or group of tagged items) could be deemed to have passed through a chokepoint when a crossover pattern has been created by lines representing plots of the RSSI values for each of the Channel A and Channel B antennas. Otherwise stated, if the strength of the signals received by the antenna facing the direction of approach are first stronger and then weaker than those received by the antenna facing the direction of retreat, then the relevant tagged items are deemed to have passed through the chokepoint.

Figure 4C:
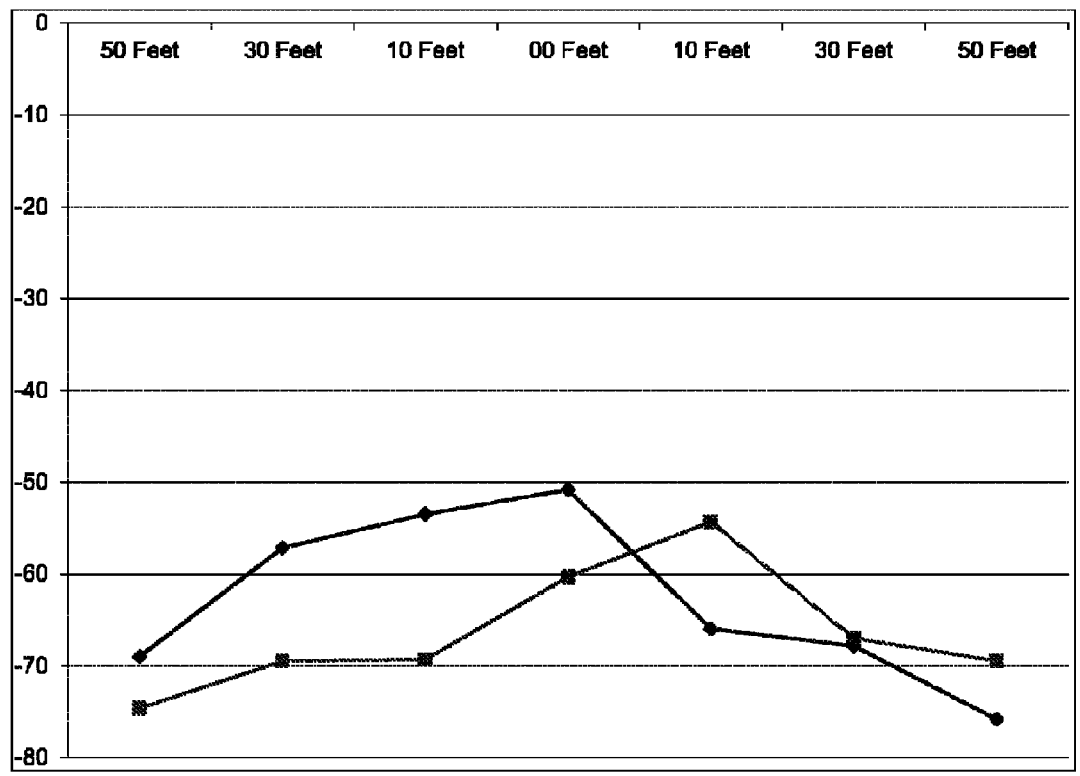
FIG. 4C shows a sample of an actual cross-over pattern using an average of all tags.

Examination of the chart for Tags 800, 802 and 804 (in FIG. 4A) each reveals a crossover pattern. The 2 lines in the chart of FIG. 4C represent the average of the RSSI values for the 3 tagged items comprising packed stack 806. Such chart shows a crossover pattern just after packed stack 806 passed the Mobile Cart (i.e., just after "00 feet"). Such chart also shows the Channel A and B lines touching each other at about 30 feet into the direction of retreat, indicating a "near-latent" crossover pattern.

Such "premature," "latent" and "near-latent' crossover patterns are indicative of the above discussed difficulties in converting RSSI values into reliable measurements of distance. In the tests conducted by the current inventors, in every instance in which a tagged item (or group of tagged items) passed through a chokepoint a crossover pattern was, in fact, created. However, there were also instances when premature and latent crossover patterns were created. There were no instances, during the tests conducted by the current inventors, in which either a premature or latent crossover pattern occurred within 10 feet of an ideal chokepoint pattern.

Depending upon the level of reliability required in a particular situation, the criteria for passage through a chokepoint may comprise a combination of a crossover pattern and an ideal chokepoint pattern. In one particular scenario, both of such patterns may be required to occur within a defined time period of each other (e.g., 3 seconds or 5 seconds) for a tagged item (or group of tagged items) to be deemed as having passed through a chokepoint. In another, less stringent, scenario, the occurrence of either of such patterns may be sufficient to satisfy the requirement for deemed passage through a chokepoint.

As exemplified above, the data points utilized for purposes of determining passage through a chokepoint may consist of RSSI values for either individual tagged items or averaged over a defined set of tagged items. In the tests conducted so far by the current inventors, passage through a chokepoint has been determined with 100% reliability, based upon a methodology of applying averaged RSSI values (for defined sets of tagged items) to criteria requiring both a crossover pattern and an ideal chokepoint pattern (for passage through a chokepoint to be deemed to have occurred). In no instance of such testing has such methodology resulted in either a "false negative" (in which passage actually occurred but was not deemed to have occurred) or a "false positive" (in which passage was deemed to have occurred but did not actually occur).

Zone Determination Using RSSI Values

The present invention discloses two methods of utilizing RSSI values to determine the particular zone (or defined area) in which tagged items are located. Such methodology is useful under circumstances where such zone is located within a greater area comprising a plurality of zones (i.e., where such zone is a subset of a larger area).

As discussed above, a reason why currently available radio frequency technology has had limited success in making zonal determinations is because RSSI values often vary greatly from tag to tag even when such tags are positioned close to each other. Such zonal determination efforts have largely relied upon the RSSI values received from individual tags, or individual tagged items. Testing conducted by the current inventors reveals that a significantly higher degree of reliability can be achieved when zonal determination is based upon RSSI values averaged over a defined set of tags where all tags comprising any such set are located within a single stack.

During such tests, the floor of a particular building was divided into 3 different contiguous zones, such division being conceptual (e.g., there were no physical walls separating the zones). One unit of the Mobile Cart (each such unit comprising two oppositely facing antennas attached to a reader) was positioned in each of such zones. The Mobile Carts were not oriented so that their antennas faced in any particular direction. Such "lack of orientation" was done to reflect the fact that in many "real world" situations, tagged items would be randomly strewn around a Mobile Cart, resulting in no particular orientation between a Mobile Cart and tagged items.

A packed stack was also positioned in each of such zones, each of such stacks comprising five tagged nestable plastic containers sitting atop a tagged compatible dolly (i.e., a total of 6 tags per stack). The packed stack in each zone was positioned closer to the Mobile Cart in that particular zone than the Mobile Cart in any other zone. Throughout the tests, all Mobile Carts and packed stacks were stationary.

FIG. 5 shows readings of the RSSI values received during a particular test by 2 of the 3 different Mobile Carts from the 3 different packed stacks. As reflected in FIG. 5, Cart 1 and Cart 2 were located in Zone 1 and Zone 2, respectively. Within FIG. 5, 2 columns are reflected under each of Zone 1 and Zone 2. The first (or far left) column under each zone shows the RFID tag numbers of the boxes and dolly comprising the packed stack located within that zone. In each case, the top 5 tag numbers are for the containers and the bottom tag number is for the dolly.

For example, within Zone 1, the RFID tag numbers of the 5 containers are 810, 812, 814, 816 and 818. The tag number of the dolly is 820.

With respect to each tag, FIG. 5 shows the RSSI values (in units of decibels) received by the Channel A and Channel B antennas within each Mobile Cart, as well as the average of such Channels (referred to within FIG. 5 as the "Tag Average"). FIG. 5 indicates that better reliability in determining zonal location of tagged items may be attainable by averaging the RSSI values received by 2 oppositely facing antennas than by utilizing the RSSI values received by a single antenna.

In addition to such oppositely facing antenna configuration, other configurations may result in better reliability than a single antenna for purposes of zonal determination. Without limitation, examples of such other configurations include 2 antennas both facing in the same direction, 2 antennas positioned at various angles with to each other and arrangements utilizing more than 2 antennas.

As stated above with respect to chokepoint determinations, such averaging is only possible where a "set" of tagged items can be identified. Accordingly, the methods and procedures disclosed herein to identify "sets" of tagged items in real time can be used to improve the success rate of determining the zone in which a set of tagged items is located. As also stated above with respect to chokepoint determinations, the methods and processes disclosed herein for attributing properties to sets of tagged items can further contribute to the success rate of zonal determinations.

In certain real world situations, it would be feasible to orient the above described Mobile Cart such that one of the two oppositely facing antennas are facing one particular zonal location, while the other antenna is facing another zonal location. Tests by the current inventors indicate that under such circumstances, the RSSI values received by any one of such antennas will be stronger for the tags located in the zone in which such antenna is facing than for the tags located in the zone that such antenna is not facing. Therefore, it is possible to use a singular Mobile Cart, comprising two oppositely facing antennas, to determine the zone in which particular tagged items are located. The reliability of such distinctions may be improved by averaging RSSI values across sets of tagged items, as opposed to only utilizing RSSI values of individual tags.

Program Code and Computer Architecture

Figure 6:
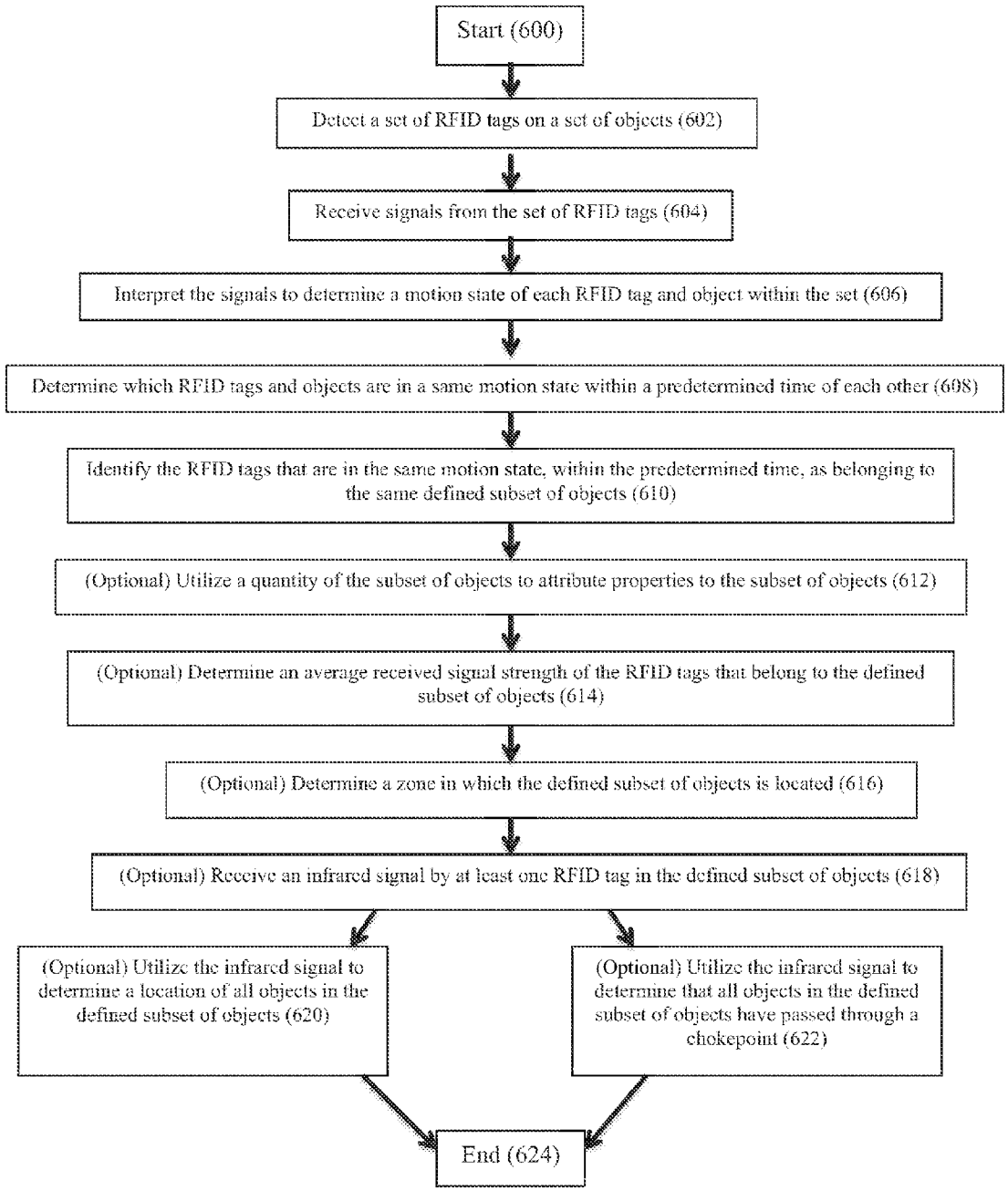
FIG. 6 shows a flowchart of a process for determining when a set of RFID tags on a set of objects belongs to a same defined subset of objects, according to one embodiment of the present invention.

FIG. 6 shows a flowchart of a process for determining when a set of RFID tags on a set of objects belongs to a same defined subset of objects, according to one embodiment of the present invention. The process begins at step 600. Step 602 detects the set of RFID tags on the set of objects, said RFID tags comprising integrated devices capable of sending signals that can be received by a receptor device and interpreted to determine a motion state of each RFID tag and object. Step 604 receives said signals from the set of RFID tags. Step 606 interprets said signals to determine the motion state of each RFID tag and object within the set, wherein said signals indicate whether the motion state of each RFID tag and object is in a state of stationary, starting in motion, stopping in motion, or continuing in motion. Step 608 determines which RFID tags and objects are in a same motion state within a predetermined time of each other. Step 610 identifies the RFID tags that are in the same motion state, within the predetermined time, as belonging to the same defined subset of objects.

In one embodiment of the process, step 612 utilizes a quantity of objects to attribute properties to the subset of objects. For example, a large number of boxes (e.g., 30), can only be nested inside each other with the lids open, and cannot be stacked on top of each other with the lids closed.

In one embodiment of the process, step 614 determines an average received signal strength of the RFID tags that belong to the defined subset of objects. Since the set of RFID tags have been identified as belonging to the same defined subset, the received signal strength may be averaged over the set of RFID tags.

In one embodiment of the process, step 616 determines a zone in which the defined subset of objects is located. The determination may be based on the average received signal strength of the RFID tags that belong to the defined subset of objects, may be based on "infrared curtains," or may be based on any of the other zone identification methods disclosed in the current application.

In one embodiment of the present invention, step 618 receives an infrared signal by at least one RFID tag in the defined subset of objects. This infrared signal may be used to determine a location of all objects in the defined subset of objects, as shown in step 620. Since the RFID tags have been identified as belonging to the same defined subset, receiving an infrared signal by a single RFID tag in the identified subset can be used to infer the location of the entire subset. This infrared signal may also be used to determine that all objects in the defined subset of objects have passed through a chokepoint, as shown in step 622. Since the RFID tags have been identified as belonging to the same defined subset, receiving an infrared signal from a chokepoint by a single RFID tag in the identified subset can be used to infer that the entire subset has passed the chokepoint.

The process described in reference to FIG. 6 ends in step 624.

Figure 7:
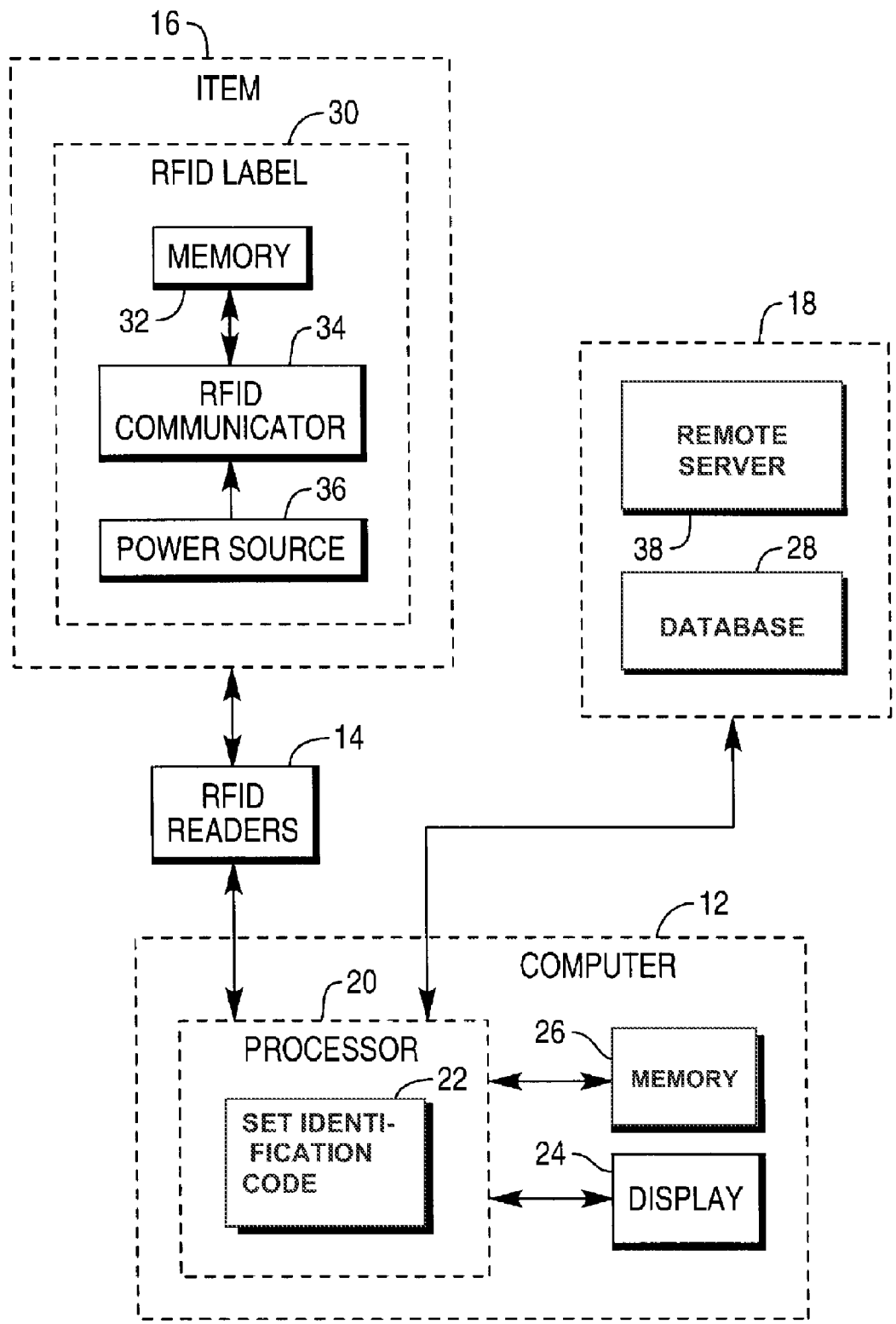
FIG. 7 shows a schematic of a system for determining when a set of RFID tags on a set of objects belongs to a same defined subset of objects, according to yet another embodiment of the present invention.

FIG. 7 shows a schematic of a system for determining when a set of RFID tags on a set of objects belongs to a same defined subset of objects, according to another embodiment of the present invention. The system includes a set of RFID tags 30 attached to the set of objects 16, said RFID tags comprising a memory 32 for storing the RFID tag's unique identification number, and an RFID communicator 34 (integrated device capable of sending signals that can be received by a receptor device and interpreted to determine a motion state of each RFID tag and object). One or more RFID receivers 14 (or RFID readers) are used for receiving signals from said RFID tags 30. A computer 12 is provided, which includes a processor 20 for processing program code 22, and one or more memories 26 for storing program code 22, coupled to the processor 20, which when executed by the processor 20 execute a process for identifying a set. The process includes the steps of: (1) detecting the set of RFID tags on the set of objects; (2) receiving said signals from the set of RFID tags; (3) interpreting said signals to determine the motion state of each RFID tag and object within the set, wherein said signals indicate whether the motion state of each RFID tag and object is in a state of stationary, starting in motion, stopping in motion, or continuing in motion; (4) determining which RFID tags and objects are in a same motion state within a predetermined time of each other; and (5) identifying the RFID tags that are in the same motion state, within the predetermined time, as belonging to the same defined subset of objects.

The computer 12 may also have a display 24, and any other components normally included in a computer system. The computer 12 may also communicate with an external site 18, such as the cloud, which may have a remote server 38 and database 28 for storing information about the RFID tags and associated objects.

In one embodiment of the present invention, the RFID reader 14 comprises a Doppler detector.

In an embodiment where RFID tags 30 are active tags, power source 36 comprises a battery.

In an embodiment where RFID tags 30 are passive tags, power source 36 comprises electronic components adapted to receive radio waves transmitted by an RFID reader and to utilize such waves as a source of power to energize their circuits, thereby enabling such passive tags to transmit radio wave signals back to the reader.

In an embodiment where RFID tags 30 are semi-passive tags, power source 36 comprises a combination of: (i) a battery to power the tag's chip (generally a "microchip") and (ii) electronic components adapted to receive radio waves transmitted by an RFID reader and utilize such waves as a source of power to energize the circuits that enable such semi-passive tags to transmit radio wave signals back to the reader.

SCOPE OF INVENTION

The invention disclosed herein have applicability in a large variety of fields including, without limitation, office moving, household goods moving, record storage, trucking, freight, train and rail transportation, air transportation, logistics, warehousing, manufacturing, hospitals and education. As examples, the present invention may be used for locating boxes aboard dollies in connection with office moving, household goods moving, or record storage.

Boxes used in office moving and record storage are typically used to hold and move file folders and other items commonly found in office environments. Boxes used in household goods moving are typically used to hold and move items commonly found in home environments, such as clothing and kitchen items. Boxes used in trucking, freight, rail transportation, air transportation, logistics, warehousing, and manufacturing are used to hold manufactured and agricultural goods, sometimes referred to as "freight."

As used herein, the words "box," "carton," and "container" are interchangeable with each other, and all refer to an object that is used to store or ship items within the fields in which the present invention is being used.

The scope of the present invention encompasses all means and technologies that can be adapted towards realization of the inventions disclosed hereunder including, without limitation: (i) all forms of electronic circuitry, whether digital, analog, mixed-signal or otherwise; (ii) all forms of electrical power, whether AC, DC or otherwise; (iii) all sources of electric power, whether battery, solar, nuclear or otherwise; and (iv) all types of tags, whether "active" (in which an internal battery powers both the microchip and propagation of radio waves), "semi-passive" (in which an internal battery powers only the microchip), and/or passive (in which there is no internal battery, and the tag utilizes radio waves transmitted by an RFID reader as a source of power to energize its circuits, thereby enabling the tag to transmit a radio wave signal back to the reader) or otherwise.

The scope of the present invention further encompasses all forms of logic circuitry that can be adapted towards realization of the inventions disclosed hereunder including, without limitation, the use of silicon or some other material, and whether or not such circuitry is created by a means that does not utilize material.

The scope of the present invention includes certain "chipless technologies" in which no circuitry is utilized. In those technologies, conductive materials or fibers are used to reflect a portion of the reader's signal back to it and thereby return a unique signal to the reader that can be used as an identifier.

The scope of the present invention further includes tags that use types of wireless communication that are not based in radio waves. Such tags include, without limitation, Surface-Acoustic-Wave (SAW) tags which communicate by propagating sound waves.

The scope of the present invention includes both tags that contain and tags that do not contain their own internal microchip for storage of data.

The scope of the present invention includes both tags that have integrated motion sensors, and tags that do not have integrated motion sensors and instead rely on the Doppler effect to determine a motion state of the tags.

The scope of the present invention includes both tags that have integrated Infrared sensors and tags that do not have integrated Infrared sensors.

The scope of the present invention includes alternatives to the "average" (or "mean"), including without limitation "mode," "median," "deviation," or other measures of central tendency.

The scope of the present invention applies to defined sets of tagged items other than the nestable plastic containers and compatible dollies utilized herein to exemplify such concepts.

The scope of the present invention also applies to a set comprised of multiple tags attached to an individual item.

For purposes of the present invention:
1. The word "tag" means a device that is small and light enough to be conveniently and easily applied to or incorporated inside or outside a product, animal, plant or person; such device comprising a means for transmitting or reflecting a wireless signal that can be interpreted by another device (or set of devices) to provide information.

2. The term "RFID tag" means a tag for which the aforementioned wireless signal is a radio wave.
3. The term "active tag" means a tag that has its own internal power source such as a battery.
4. The term "active RFID tag" means an RFID tag that has its own internal power source such as a battery.
5. The term "container" means any container, pallet, object, etc. which may be tagged with an RFID tag.
6. The term "pallet" means a portable platform for transporting and storing goods, freight or other items. Typically, a pallet has a set of openings through which the blades of a forklift truck (or pallet jack) can be inserted.
7. The term "transmit" means generating and amplifying a carrier wave, modulating it with a meaningful signal, and broadcasting the resulting signal from an antenna.

While the description herein contains much specificity, these should not be construed as limitations on the scope of the invention, but rather as exemplifications of one or more embodiments thereof. Other variations and embodiments are possible. Those who are skilled in the art will readily perceive how to modify the invention. Therefore, any appended claims are to be construed to cover all equivalent structures which fall within the scope and spirit of the invention as defined by the appended claims, and should not be limited to the embodiments illustrated.

What is claimed is:

1. A method for determining when a set of RFID tags on a set of objects belongs to a same defined subset of objects, comprising:
    detecting the set of RFID tags on the set of objects, said RFID tags comprising integrated devices capable of sending signals that can be received by a receptor device and interpreted to determine a motion state of each RFID tag and object;
    receiving said signals from the set of RFID tags; interpreting said signals to determine the motion state of each RFID tag and object within the set, wherein said signals indicate whether the motion state of each RFID tag and object is in a state of stationary, starting in motion, stopping in motion, or continuing in motion;
    determining which RFID tags and objects are in a same motion state within a predetermined time of each other;
    identifying the RFID tags that are in the same motion state, within the predetermined time, as belonging to the same defined subset of objects; and
    determining a location of all the objects in the defined subset of objects by determining a location of as few as one RFID tag in the defined subset of objects.

2. The method of claim 1, wherein each RFID tag has an integrated motion sensor.

3. The method of claim 1, wherein each RFID tag has an integrated accelerometer.

4. The method of claim 1, wherein said receptor device comprises a Doppler detector.

5. The method of claim 1, wherein the motion state of each RFID tag is determined using the Doppler effect.

6. The method of claim 1, wherein the motion state of each RFID tag is determined based upon properties of waves transmitted by said RFID tag.

7. The method of claim 1, wherein the objects are selected from a group consisting of containers, boxes, dollies, pallets, and carts.

8. The method of claim 1, wherein the objects are selected from a group consisting of railroad cars, trucks, cars, boats, and livestock.

9. The method of claim 1, wherein a quantity of objects is identified as being in the same subset and said quantity is used to attribute properties to the subset of objects.

10. The method of claim 1, wherein a determination is made as to an average received signal strength of the RFID tags that belong to the defined subset of objects.

11. The method of claim 1, wherein a determination is made as to a zone in which the defined subset of objects is located, said determination based upon an average received signal strength of the RFID tags that belong to the defined subset of objects.

12. The method of claim 1, further comprising:
    receiving an infrared signal by at least one RFID tag in the defined subset of objects to determine a location of all objects in the defined subset of objects.

13. The method of claim 1, further comprising:
    receiving an infrared signal by at least one RFID tag in the defined subset of objects to determine that all objects in the defined subset of objects have passed through a chokepoint.

14. A system for determining when a set of RFID tags on a set of objects belongs to a same defined subset of objects, comprising:
    a processor for processing program code; and
    one or more memories for storing program code, coupled to the processor, which when executed by the processor execute a process comprising the steps of:
    detecting the set of RFID tags on the set of objects, said RFID tags comprising integrated devices capable of sending signals that can be received by a receptor device and interpreted to determine a motion state of each RFID tag and object;
    receiving said signals from the set of RFID tags; interpreting said signals to determine the motion state of each RFID tag and object within the set, wherein said signals indicate whether the motion state of each RFID tag and object is in a state of stationary, starting in motion, stopping in motion, or continuing in motion;
    determining which RFID tags and objects are in a same motion state within a predetermined time of each other;
    identifying the RFID tags that are in the same motion state, within the predetermined time, as belonging to the same defined subset of objects; and
    determining a location of all the objects in the defined subset of objects by determining a location of as few as one RFID tag in the defined subset of objects.

15. The system of claim 14, wherein each RFID tag has an integrated motion sensor.

16. The system of claim 14, wherein said receptor device comprises a Doppler detector.

17. A system for determining when a set of RFID tags on a set of objects belongs to a same defined subset of objects, comprising:
    a set of RFID tags attached to said objects, said RFID tags comprising integrated devices capable of sending signals that can be received by a receptor device and interpreted to determine a motion state of each RFID tag and object within the set;
    a receiver for receiving signals from said RFID tags; a processor for processing program code; and
    one or more memories for storing program code, coupled to the processor, which when executed by the processor execute a process comprising the steps of:
    detecting the set of RFID tags on the set of objects; receiving said signals from the set of RFID tags; interpreting said signals to determine the motion state of each RFID tag and object within the set, wherein said signals indicate whether the motion state of each RFID tag and object is in a state of stationary, starting in motion, stopping in motion, or continuing in motion;

determining which RFID tags and objects are in a same motion state within a predetermined time of each other;

identifying the RFID tags that are in the same motion state, within the predetermined time, as belonging to the same defined subset of objects; and determining a location of all the objects in the defined subset of objects by determining a location of as few as one RFID tag in the defined subset of objects.

18. The system of claim 17, wherein each RFID tag has an integrated motion sensor.

19. The system of claim 17, wherein said receptor device comprises a Doppler detector.

20. The system of claim 17, further comprising:

a Doppler detector for receiving said signals from the set of RFID tags.

* * * * *